(12) United States Patent
Neshaastegaran et al.

(10) Patent No.: US 10,708,107 B1
(45) Date of Patent: Jul. 7, 2020

(54) METHOD AND DECODER FOR SUPPRESSING PHASE NOISE IN AN ORTHOGONAL FREQUENCY DIVISION MULTIPLEXING SIGNAL

(71) Applicant: HUAWEI TECHNOLOGIES CO., LTD., Shenzhen, Guangdong (CN)

(72) Inventors: Peyman Neshaastegaran, Ottawa (CA); Ming Jian, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/565,870

(22) Filed: Sep. 10, 2019

(51) Int. Cl.
*H04L 27/26* (2006.01)
*H04L 1/00* (2006.01)
*H04L 7/00* (2006.01)

(52) U.S. Cl.
CPC ............ *H04L 27/265* (2013.01); *H04L 1/005* (2013.01); *H04L 7/0029* (2013.01); *H04L 27/2657* (2013.01)

(58) Field of Classification Search
CPC ..... H04L 27/265; H04L 1/005; H04L 7/0029; H04L 27/2657
See application file for complete search history.

(56) References Cited

U.S. PATENT DOCUMENTS

| | | | | |
|---|---|---|---|---|
| 6,654,432 B1* | 11/2003 | O'Shea | ............... | H04L 7/042 375/354 |
| 7,609,789 B2 | 10/2009 | Leshem | | |
| 9,258,107 B1* | 2/2016 | Warke | ................ | H04L 27/0014 |
| 2005/0070237 A1* | 3/2005 | Moriai | ................ | H04B 1/7093 455/151.1 |
| 2007/0086533 A1* | 4/2007 | Lindh | ................ | H04L 27/0014 375/260 |
| 2010/0136916 A1* | 6/2010 | Kawai | ................ | H04B 7/002 455/63.1 |
| 2016/0266186 A1* | 9/2016 | Mansour | ............ | H04B 17/354 |
| 2019/0020384 A1* | 1/2019 | Kamiya | ................ | H04B 7/005 |

OTHER PUBLICATIONS

Petrovic et al., "Effects of Phase Noise on OFDM Systems With and Without PLL: Characterization and Compensation," IEEE Transactions on Communications, vol. 55, pp. 1607-1616, 2007.
(Continued)

*Primary Examiner* — Janice N Tieu
(74) *Attorney, Agent, or Firm* — BCF LLP

(57) ABSTRACT

Phase noise (PN) is suppressed in an OFDM signal. In an initial iteration, an estimation of the PN samples in an OFDM signal vector is produced and the OFDM signal is demodulated using the initial estimation of the PN to generate constellation symbols for the initial iteration. In an additional iteration, an Inverse Fast Fourier Transform of constellation symbols generated in a preceding iteration is calculated to reconstruct preceding samples of the transmitted signal vector. A PN effect on the reconstructed samples is estimated. A next estimation of the PN in a next signal vector is produced based on the estimated PN effect on the reconstructed samples. The next signal vector is demodulated using the next estimation of the PN to generate constellation symbols for the additional iteration. A predetermined maximum number of additional iterations may be used.

21 Claims, 19 Drawing Sheets

(56) References Cited

OTHER PUBLICATIONS

Syrjala et al., "Pilot Allocation and Computationally Efficient Non-Iterative Estimation of Phase Noise in OFDM," IEEE Wireless Communications Letters, vol. 8, pp. 640-643, 2019.
Rabiei et al., "A Non-Iterative Technique for Phase Noise ICI Mitigation in Packet-Based OFDM Systems," IEEE Transactions on Signal Processing, vol. 58, pp. 5945-5950, 2010.
Casas et al., "Time domain phase noise correction for OFDM signals," IEEE Transactions on Broadcasting, vol. 48, pp. 230-236, 2002.
Leshem et al., "Phase Noise Compensation for OFDM Systems," IEEE Transactions on Signal Processing, vol. 65, pp. 5675-5686, 2017.
Zou et al., "Compensation of Phase Noise in OFDM Wireless Systems," IEEE Transactions on Signal Processing, vol. 55, pp. 5407-5424, 2007.

* cited by examiner

METHOD AND DECODER FOR SUPPRESSING PHASE NOISE IN AN ORTHOGONAL FREQUENCY DIVISION MULTIPLEXING SIGNAL

CROSS-REFERENCE TO RELATED APPLICATIONS

This is the first application filed for the instantly disclosed technology.

TECHNICAL FIELD

The present disclosure generally relates to the field of communication networks and, in particular, to a method and a decoder for suppressing phase noise in an orthogonal frequency division multiplexing signal.

BACKGROUND

Spectral efficiency is of great importance in current and future wireless communications. This has led to a move toward using the high order constellations. Orthogonal Frequency Division Multiplex (OFDM) is a well-established technology used in current and the next generation of wireless transmission links.

In coherent digital communication, high frequency carrier waveforms are used for the modulation and the demodulation of desired signals. A local oscillator (LO) at the transmitter side is used to generate the carrier signal as part of the modulation process. Conversely, a similar local oscillator is used in the demodulation process at the receiver side. In almost all practical LOs, the generated carrier waveform contains an unwanted phase offset, which is known as the oscillator phase noise (PN). Lower the PN of the carrier can only be achieved using high price the oscillators. It is common to use inexpensive LOs at both transmit and receive ends of the transmission, while compensating for the PN effect through a digital signal processing (DSP) at the receiver.

Orthogonal frequency division multiplexing (OFDM) is a common approach to battle the multipath effect in mobile communication systems. The OFDM is currently deployed in long term evolution (LTE) networks and it is proposed to be used in the 5th generation new radio (5G-NR) as well. OFDM uses large modulation constellations, such as for example the 256-quadrature amplitude modulation (QAM). Such large constellations benefit from high spectral efficiencies but also require high signal to noise ratio (SNR) levels.

The performance of the OFDM systems is severely deteriorated in the presence of PN. In particular, PN affects the OFDM systems by causing common phase error (CPE) and intercarrier interference (ICI). CPE is a joint effect of PN on all subcarriers (SC) within the OFDM symbol. CPE causes the rotation of the whole constellation. ICI causes a loss of orthogonality between the SCs. An effect of ICI appears as a set of additive terms added to the desired signal at the output of the OFDM demodulator.

FIG. 1 is a graph showing an example of an OFDM system using 256-QAM constellation affected by common phase error and intercarrier interference. FIG. 2 is a graph showing the OFDM system using 256-QAM constellation of FIG. 1 after removal of the effect of common phase error effect. On FIGS. 1 and 2, it is assumed that the radio channel between the transmitter and the receiver is mainly subject to additive white Gaussian noise (AWGN).

The PN effect visible in FIGS. 1 and 2 is caused by imperfect LOs, both at the transmitter and the receiver sides. Regardless of the constellation size, the PN effect must be compensated at the receiver in order to prevent the output SNR from becoming extremely low, sometimes negative.

Due to the nature of the OFDM technology, the transmission link operates in the frequency domain (FD) before the OFDM modulation, in the time domain (TD) over the channel, and again in FD after the OFDM demodulation. PN suppression methods may thus be implemented in either of FD or TD.

Three (3) main factors should be considered when evaluating the performance and cost of various PN suppression methods. One such factor is computational complexity. A number of complex multiplications and additions during the estimation process, a dimension of matrices that need to be inversed, and any other considerable computations needs to be taken into account. Another factor is the processing delay, which is of utmost importance in the context of 5G-NR. Finally, pilot overhead, which may be defined as a ratio between a number of transmitted pilot symbols and a number of SCs within one OFDM symbol, should be limited in order to maintain the expected spectral efficiency.

Frequency Domain PN Suppression Method

The effect of PN on the transmitted symbols at the output of the demodulator reflects as CPE and ICI. The relationship between the OFDM demodulator output and the transmitted constellation symbols at a given subcarrier (SC) is expressed in equation (1):

$$Y(k) = \sum_{m=0}^{N-1} R([k-m]_N) \cdot I(m) = \underbrace{R(k)I(0)}_{CPE} + \underbrace{\sum_{m=1}^{N-1} R([k-m]_N)I(m)}_{ICI} \quad 0 \le k \le N-1 \quad (1)$$

In equation (1), $R(k)=S(k)H(k)$, where S and H are the transmitted constellation symbol and the frequency response of the channel at the k'th SC respectively, $[q]_N$ shows q modulo N operation, the parameter I which contains the effect of PN is defined as $$I(k) = \frac{1}{N} FFT\{e^{j\phi}\},$$

where $\phi=\phi_{tx}+\phi_{rx}$ and FFT{A} is a N point Fast Fourier Transform (FFT) operation of variable A. Equation (1) reveals that the CPE effect is independent of the SC index, while ICI is different at each SC.

In the FD PN suppression method, a DSP algorithm is implemented in the receiver, after the OFDM demodulation. The FD PN suppression is performed in two stages. In a first stage, CPE is removed through an averaging procedure. The computational complexity and the required overhead of this first stage are small. However, removing the CPE alone is only sufficient in the case of small constellations, such as quadrature phase shift keying (QPSK) or 16-QAM. To further suppress the PN effect from OFDM demodulated signals, the effect of ICI needs to be mitigated as well. As opposed to the CPE removal, ICI mitigation is a complex process. This process not only requires more known pilot symbols among transmitted data symbols, it also requires an algorithm capable of estimating ICI in every SC, using the knowledge of the pilot symbols.

The following general ICI mitigation approach is followed in conventional FD PN suppression methods. Their mathematical models are based on the assumption that PN is a low frequency process, in the sense that a power spectral density (PSD) of the PN is mainly concentrated in low frequency components. With this assumption, the ICI mitigation problem is formulated as an estimation of a few small frequency components and neglecting the rest. Otherwise stated, instead of finding all of the N ICI terms in equation (1), the FD PN suppression method approach only estimates 2l+1 terms, in which l is usually less than 5 among the N ICI terms in equation (1). Adding 1 is attributed to the CPE removal, which corresponds to SC 0 (a null SC position). Several mathematical approaches may be adopted to estimate the aforementioned 2l+1 components from the received pilot information. In terms of computational complexity, the solution to the estimation problem, in its simplest form, includes a matrix inversion of dimension (2l+1)×(2l+1). This matrix inversion forms a major computational burden in the FD PN suppression method.

Among various FD PN suppression methods, an iterative approach has been proposed to further improve the initial estimation result. A particular algorithm for this iterative approach includes a feedback loop that uses a detected data symbols after using a forward error correction (FEC) process. In each iteration, an estimation problem is re-solved and the 2l+1 ICI terms are re-estimated. The difference in each iteration lies in a formed set of equations. As more reliable data symbols become available at the output of the FEC, the equation coefficients are updated. As a result, a better estimate of ICI terms may be achieved by solving the updated equation. The estimated ICI terms, obtained using this iterative scheme, are more accurate when compared to the one time solving of the equations.

FD PN suppression methods, whether it is iterative or not, are effective in compensating the effect of PN when the constellation size is 64-QAM or smaller. However, a major computational burden of these techniques is due to matrix inversion operations. Applying the iterative FD PN suppression method causes a significant processing delay increase. A resulting increased latency is attributed in part to the intrinsic delay within the FEC operation and in part to the repetition of the computations in the feedback loop. To keep the computational complexity and the latency low, a specific pilot arrangement among the data stream has been proposed. The estimation problem is then solved using a least squares (LS) solution. Nevertheless, achieving consistent results requires solving equations for several sets of pilot symbols, which increases the pilot overhead significantly. This deficiency is related to neglecting of the additive noise in the LS solution. Minimum mean square error (MMSE) solvers, on the other hand, may be used but require a knowledge of the statistical behavior of the PN, which may not be available in practice. Other problems related to the FD PN suppression methods, include, for example, the intrinsic periodicity of the estimated PN that results in a poor estimation performance near the edges of the OFDM symbol. The assumption that PN is a low frequency process may not be verified for some LO implementations.

Time Domain PN Suppression Method

The TD PN suppression method tries to estimate the effect of PN before actual demodulation of samples of the OFDM signal vector. By de-rotating the samples of the OFDM signal vector in the time domain, the OFDM demodulation is then performed on compensated samples. FIG. 3 is a block diagram of an OFDM network implementing a conventional time domain phase noise removal method. On FIG. 3, an OFDM network 1 comprises a transmitter side in which an encoder 2 includes a symbol generator 4 receiving data to be transmitted over the OFDM network 1. The symbol generator 4 applies an M-level modulation (hence "M-ary modulation") to generate, in the frequency domain, constellation symbols S. The constellation symbols S are applied to an OFDM modulator 6 to generate, in the time domain, a baseband OFDM signal vector $x_I$. The baseband OFDM signal vector $x_I$ is then applied to a transmit-side LO 8 that converts the baseband OFDM signal vector $x_I$ to a radiofrequency OFDM signal x. The radiofrequency OFDM signal x may be amplified by an amplifier (not shown) before being transmitted by an antenna (not shown) over a channel 10.

The OFDM network 1 also comprises a decoder 12 on a receiver side. The radiofrequency OFDM signal x being received on the channel 10 as a radiofrequency OFDM signal $y_{ch}$ on an antenna (not shown). After being amplified by an amplifier (not shown), the radiofrequency OFDM signal $y_{ch}$ is applied to a receive-side LO 14 that converts the radiofrequency OFDM signal $y_{ch}$ to a baseband OFDM signal vector y. A PN estimation block 16 applies the TD PN estimation method to calculate a PN estimation Ø, using this PN estimation Ø to de-rotate the baseband OFDM signal vector y based on an estimation of the PN, thereby generating a baseband OFDM signal vector ŷ in which at least some of the PN effects have been suppressed. The OFDM signal vector ŷ is applied to an OFDM demodulator 18 that generates, in the frequency domain, samples of the demodulated OFDM signal vector Ŷ. In turn, the samples of the demodulated OFDM signal vector Ŷ are applied to a slicer 20 that generates constellation symbols Ŝ.

The constellation symbols Ŝ reproduce, as much as possible, the constellation symbols S from the encoder 2. However, errors may be present in the constellation symbols Ŝ. An FEC processor 22 may detect and correct data errors present in the constellation symbols Ŝ.

A mathematical derivation of the TD PN suppression method illustrated in FIG. 3 is briefly explained as follows. Referring again to FIG. 4, the end-to-end transmission may be expressed according to equation (2):

$$y = \psi_{tot} H_m \frac{1}{N} F^H S + w \qquad (2)$$

In equation (2), F is a discrete Fourier transform (DFT) matrix of size N and $F^H$ is a Hermitian transpose of F. $H_m$ is a circular convolution matrix of the channel 10 with attenuation vector h. $\psi_{tot}$=diag$\{e^{j\Phi}\}$, wherein diag$\{X\}$ is a diagonal matrix with the diagonal elements of X. Since $H_m$ is a circulant matrix, it may be diagonalized using the DFT matrix as $$H_m = \frac{1}{N} F^H \Lambda F.$$

It may be noted that $$F^{-1} = \frac{1}{N} F^H.$$

Replacing the diagonalized $H_m$ in equation (2) gives the following equation (3):

$$y = \frac{1}{N} \psi_{tot} F^H \Lambda S + w \qquad (3)$$

The TD PN suppression method is formulated as finding the diagonal matrix ψ, such that, ideally, $\psi\psi_{tot}=I_N$, wherein $I_N$ is the unitary matrix of dimension N. If the desired matrix is found, one may simply let ŷ=ψy, meaning that y is de-rotated, and send ŷ to the OFDM demodulator 18. In that case, the output of the OFDM demodulator 18 becomes Ŷ=ΛS+W.

The diagonal matrix ψ may be estimated on the basis of its diagonal elements. Thus, Φ is defined as the vector of the diagonal elements of the diagonal matrix ψ. The TD PN suppression method estimates the vector Φ using the following two components.

Firstly, a set of d basis vectors is used, wherein each basis vector $v_i$ is a N dimensional vector. This gives that the total basis vectors are placed in the matrix $V=[v_1, \ldots, v_d]$.

Secondly, the vector of d coefficients corresponding to the basis vectors (1 scaler coefficient for each basis vector) is used. The coefficient vector is shown with γ.

The desired vector Φ is written as Φ=Vγ. Thus, ŷ=ψy=$Y_m$Vγ, wherein $Y_m$ is a diagonal matrix with the vector y on its diagonal. The OFDM demodulator 18 acts as an FFT operator, in the sense that Ŷ=Fŷ. This may also be written as Ŷ=F$Y_m$Vγ. By letting M=F$Y_m$V, equation (4) may be formed:

$$M\gamma = \Lambda S + \tilde{W} \rightarrow S = \Lambda^{-1} M\gamma + \tilde{W}, \quad (4)$$

In equation (4), $\tilde{W}$ is a vector of AWGN. Estimating the PN samples is equivalent to finding the matrix V and vector γ. The basis vectors are assumed to be chosen and fixed; this is a mild assumption as there exists some basis sets that may be readily used. As an example, a discrete cosine transform (DCT) basis may be used. Thus, γ may be estimated from equation (4). There is in equation (4) a set of N equations. However, the elements of the constellation symbols S are not (all) known so all the N equations cannot be used. Instead the equations corresponding to the pilot locations are used. Assuming there are L pilots, the set of L equations is written as expressed in equation (5):

$$S_p = [\Lambda^{-1} M]_p \gamma + \tilde{W}_p \quad (5)$$

All the elements in equation (5) are known except for γ, which is the desired vector. To find γ, the LS solution is used, which gives $\hat{\gamma} = [[\Lambda^{-1}M]_p]^\dagger S_p$.

Comparing the FD and TN PN Suppression Methods

The TD PN suppression method has received less attention when compared to the FD PN suppression method. Nevertheless, the TD PN suppression method has a superior estimation performance when compared the FD PN suppression method, when both methods are used with equal pilot symbol overhead and comparable computational complexity and latency.

FIG. 4 is a graph comparing a performance of conventional frequency domain and time domain phase removal methods. For further verifications, the mean squared error (MSE) of the PN estimation between the TD PN suppression method and the FD PN suppression method, which are considered the state-of-the-art in the PN suppression in OFDM system, are compared in FIG. 4. On a graph 30, the FD and TD PN suppression methods are compared when using a 256-QAM constellation and a SNR of 32 dB. MSE is calculated as $20 \times \log_{10}|\phi - \hat{\phi}|$, where φ is the actual PN and φ̂ is the estimated PN at a given SC. The number of OFDM symbols is 50, and each symbol contains 3300 active SCs. The FFT size is 4096. These numbers are in line with the OFDM requirements mentioned in the release 15 of the 3$^{rd}$ Generation Partnership Project (3GPP) specification when the channel bandwidth is 400 MHz. In both cases, the pilot symbol overhead is 1%.

On the graph 30, a MSE curve 32 represents the performance when the FD PN suppression method is limited to CPE removal. A MSE curve 34 represents the estimation performance when l equal to 4 frequency components are used. This involves taking the inverse of a matrix with dimension (2l+1)×(2l+1), which is 9×9 in this case. A MSE curve 36 represents the performance when the TD PN suppression method is used with a number d of basis vectors is set to 8.

Comparing MSE curves 34 and 36, the performance of the TD PN suppression method, with the same pilot symbol overhead, is almost 5 dB better than that of the FD PN suppression method. It would be possible to improve the performance of the FD PN suppression method to the level of the TD PN suppression method, but that could only be done at the cost of a significant increase of the pilot symbol overhead. This is due to the fact that when using the LS solution, which is more practical than using the MMSE solution, the effect of the additive noise and of the ICI terms (in equation (1)), other than those that are being estimated are neglected. To avoid this problem, more pilot symbols and more equations (for the same set of ICI terms in equation (1)) would need to be used. The final result would then be the average of the answers of equation (1). Compared to the TD PN suppression method, where the estimation problem is solved using the LS solution just once, the FD PN suppression method clearly requires more overhead and greater computational complexity.

Although TD PN suppression method is an attractive solution to suppress the PN in the OFDM systems, its performance is no longer satisfactory when the OFDM network 1 relies on larger constellation sizes. When using high order modulations, for example 256-QAM and higher, the TD PN suppression method with a reasonable overhead and a small set of basis vectors fails to meet the PN estimation performance requirements. Satisfactory performance may only be obtained by increasing the pilot symbol overhead and the number of applied basis vectors. The former contradicts with the actual intent of using the large constellations, which is to reach high spectral efficiency, while the latter significantly increases the computational complexity. The high computational complexity is due to the requirement for a higher number of basis vectors used in the estimation process. A matrix inversion with the dimension equal to the number of basis vectors is necessary and the matrix inversion, a complexity of this operation increasing with a cubic order of the number of basis vectors.

FIG. 5 is a graph comparing a performance of the PN estimation using the time domain method for different overhead and number of basis vectors combinations. A graph 40, produced using the same simulation parameters as those used to produce the graph 30, illustrates simulation results on a MSE curve 42 for the TD PN suppression method, with a number of basis vectors of 10, which translates to a 10×10 matrix inversion, and 1% pilot symbol overhead. The performance of MSE curve 42 is not sufficient for a 1024-QAM constellation. A MSE curve 44 shows simulation results for the TD PN suppression method with a number of basis vectors of 40, which translates to a 40×40 matrix inversion, and 10% pilot symbol overhead. The MSE curve 44 meets the PN estimation requirements for a 1024-QAM constellation. The simulation results confirm that reaching the PN estimation performance that are required when large constellations are used necessitates a large overhead ratio and complex matrix inversion operations. Unfortunately, a pilot symbol overhead as large as 10% is excessive from a spectral efficiency standpoint, and performing a 40×40 matrix inversion for each OFDM symbol is not realistic.

The LOs are indispensable parts of every digital communication device and the PN is presence is almost all types of LOs. Consequently, there is a need for improved PN suppression techniques that overcome the above-described inconveniences.

SUMMARY

Embodiments of the present technology have been developed based on developers' appreciation of shortcomings associated with the prior art.

In particular, such shortcomings may comprise (1) performance deterioration of ODFM systems caused by phase noise; (2) computational complexity of conventional methods of overcoming phase noise effects; (3) significant overhead that conventional methods require for overcoming the phase noise effects; and/or (4) processing delays introduced by conventional methods of overcoming phase noise effects.

In one aspect, various implementations of the present technology provide a method for suppressing phase noise in an orthogonal frequency division multiplexing (OFDM) signal, comprising:
  in an initial iteration:
    producing an initial estimation of the phase noise in initial samples of an OFDM signal vector, and
    demodulating the initial samples of the OFDM signal vector using the initial estimation of the phase noise to generate constellation symbols for the initial iteration; and
  in at least one additional iteration following the initial iteration:
    calculating an Inverse Fast Fourier Transform (IFFT) of constellation symbols generated in a preceding iteration to reconstruct samples of the OFDM signal vector demodulated in the preceding iteration,
    estimating a phase noise effect on the reconstructed samples of the OFDM signal vector,
    producing a next estimation of the phase noise in next samples of the OFDM signal vector based on the estimated phase noise effect on the reconstructed samples of the OFDM signal vector, and
    demodulating the next samples of the OFDM signal vector using the next estimation of the phase noise to generate constellation symbols for the at least one additional iteration.

In some implementations of the present technology, the preceding iteration is an immediately preceding iteration.

In some implementations of the present technology, producing the next estimation of the phase noise in the OFDM signal comprises:
  calculating a moving average of values of the estimated phase noise effect on the reconstructed samples of the OFDM signal vector;
  calculating an angle of the moving average of the values of the estimated phase noise effect; and
  interpolating the angle of the moving average of the values of the estimated phase noise effect.

In some implementations of the present technology, the moving average is calculated over a window size in a range of 5 to 50 values of the estimated phase noise effect.

In some implementations of the present technology:
  demodulating the initial samples of the OFDM signal vector using the initial estimation of the phase noise comprises de-rotating the initial samples of the OFDM signal vector using the initial estimation of the phase noise; and
  demodulating the next samples of the OFDM signal vector using the next estimation of the phase noise comprises de-rotating the next samples of the OFDM signal vector using the next estimation of the phase noise.

In some implementations of the present technology:
  demodulating the initial samples of the OFDM signal vector using the initial estimation of the phase noise comprises slicing the demodulated initial samples of the OFDM signal vector to generate the constellation symbols for the initial iteration; and
  demodulating the next samples of the OFDM signal vector using the next estimation of the phase noise comprises slicing the demodulated next samples of the OFDM signal vector to generate the constellation symbols for the at least one additional iteration.

In some implementations of the present technology, estimating the phase noise effect on the reconstructed samples of the OFDM signal vector comprises comparing samples of the OFDM signal vector from the preceding iteration with the reconstructed samples of the OFDM signal vector.

In some implementations of the present technology, the method further comprises applying a time delay to the OFDM signal vector to align the samples of the OFDM signal vector from the preceding iteration with the reconstructed samples of the OFDM signal vector.

In some implementations of the present technology, the initial and next estimations of the phase noise are produced in the time domain.

In some implementations of the present technology, a constellation size is selected from 2, 4, 8, 16, 32, 66, 128, 256, 512, 1024, 2048 and 4096.

In some implementations of the present technology, producing the initial estimation of the phase noise in the samples of the OFDM signal vector comprises:
  removing a common phase error on all subcarriers of the OFDM signal based on pilot symbols contained in the OFDM signal; and
  implementing a feedback loop using forward error correction to iteratively mitigate inter carrier interference within the OFDM signal.

In some implementations of the present technology, producing the initial estimation of the phase noise in the initial samples of the OFDM signal vector comprises applying a linear transformation on a time-domain representation of pilot information contained in the OFDM signal to produce a time-dependent representation of the phase noise.

In some implementations of the present technology, the method further comprises:
  comparing the constellation symbols generated in the at least one additional iteration with the constellation symbols generated in the preceding iteration; and
  initiating another additional iteration if a difference between the constellation symbols generated in the at least one additional iteration and the constellation symbols generated in the preceding iteration is greater than a predetermined margin and if a predetermined maximum number of iterations has not been reached.

In another aspect, various implementations of the present technology provide a non-transitory computer readable medium having stored thereon computer executable instructions that, when executed, cause a processor to perform a method for suppressing phase noise in an orthogonal frequency division multiplexing (OFDM) signal.

In a further aspect, various implementations of the present technology provide a decoder for suppressing phase noise in an orthogonal frequency division multiplexing (OFDM) signal, comprising:

a local oscillator adapted to convert an OFDM signal to an OFDM signal vector;

an OFDM demodulator adapted to demodulate the OFDM signal vector to produce demodulated samples of the OFDM signal vector using a supplied phase noise estimation;

a slicer adapted to generate constellation symbols from the demodulated samples of the OFDM signal vector; and a processing unit operatively connected to the local oscillator, to the OFDM demodulator and to the slicer, the processing unit being adapted to, in an initial iteration:

produce an initial estimation of the phase noise in initial samples of the OFDM signal vector, and supply the initial estimation of the phase noise to the OFDM demodulator;

the processing unit being further adapted to, in at least one additional iteration following the initial iteration:

calculate an Inverse Fast Fourier Transform (IFFT) of constellation symbols generated in a preceding iteration to reconstruct samples of the OFDM signal vector demodulated in the preceding iteration, estimate a phase noise effect on the reconstructed samples of the OFDM signal vector, produce a next estimation of the phase noise in next samples of the OFDM signal vector based on the estimated phase noise effect on the reconstructed samples of the OFDM signal vector, and supply the next estimation of the phase noise to the OFDM demodulator.

In some implementations of the present technology, the OFDM demodulator is further adapted to de-rotate the samples of the OFDM signal vector using the supplied phase noise estimation.

In some implementations of the present technology, the OFDM demodulator comprises a Fast Fourier Transform (FFT) processor.

In some implementations of the present technology, the processing unit is further adapted to implement an estimator for calculating the phase noise effect on the reconstructed samples of the OFDM signal vector based on comparing samples of the OFDM signal vector from the preceding iteration with the reconstructed samples of the OFDM signal vector.

In some implementations of the present technology, the processing unit is further adapted to implement a delay processor for applying a time delay to the OFDM signal vector to align the samples of the OFDM signal vector from the preceding iteration with the samples of the reconstructed OFDM signal vector.

In some implementations of the present technology, the processing unit is further adapted to implement:

an IFFT processor for reconstructing the samples of the OFDM signal vector demodulated in the preceding iteration;

a filter for calculating a moving average of values of the estimated phase noise effect on the reconstructed samples of the OFDM signal vector;

an angle calculator for calculating an angle of the moving average of the values of the estimated phase noise effect; and an interpolator for interpolating the angle of the moving average of the values of the estimated phase noise effect, the interpolator producing the next estimation of the phase noise.

In some implementations of the present technology:

the OFDM signal contains forward error correction (FEC) information; and the processing unit is further adapted use the FEC information after suppressing the phase noise in the samples of the OFDM signal vector to correct data errors present in the constellation symbols.

BRIEF DESCRIPTION OF THE DRAWINGS

The features and advantages of the present disclosure will become apparent from the following detailed description, taken in combination with the appended drawings, in which.

Figure 2:
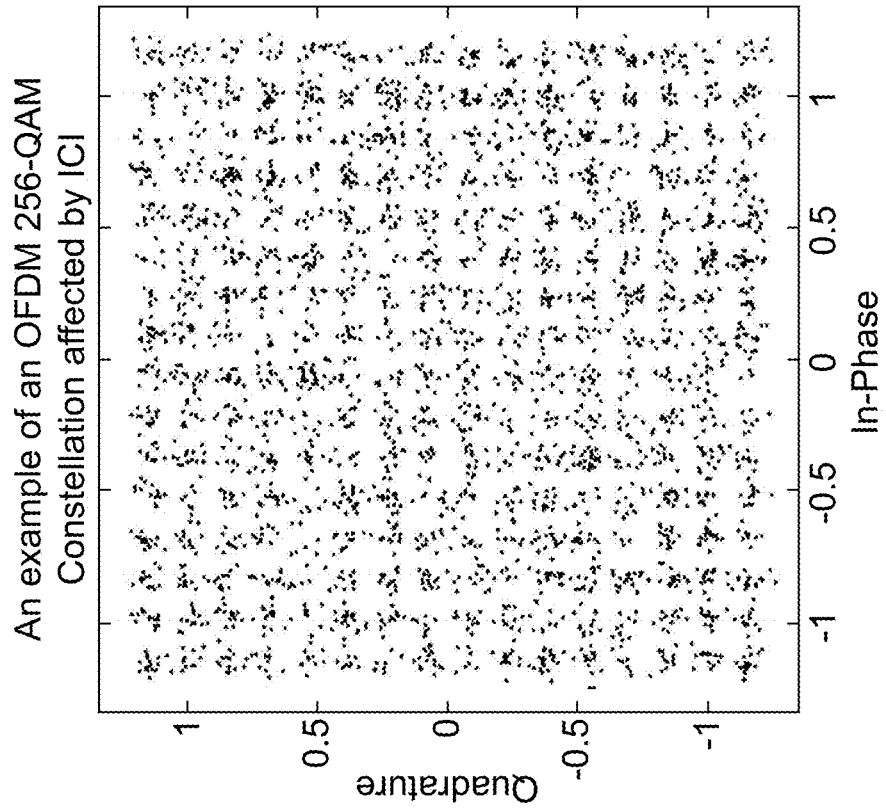
FIG. 2 is a graph showing the OFDM system using 256-QAM constellation of FIG. 1 after removal of the effect of common phase error effect.
Figure 1:
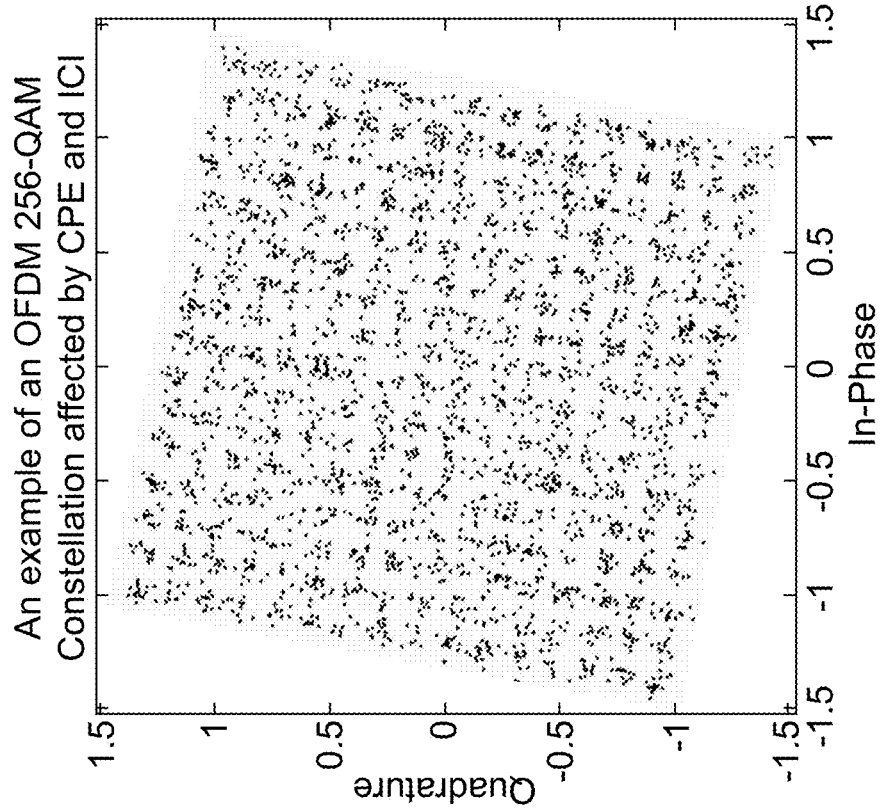
FIG. 1 is a graph showing an example of an OFDM system using 256-QAM constellation affected by common phase error and intercarrier interference.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Unless otherwise defined, all technical and scientific terms used herein have the same meaning as commonly understood by one of ordinary skill in the art to which the described embodiments appertain to.

Generally speaking, the present disclosure supplements any one of earlier phase noise (PN) suppression techniques with the addition of a supplemental time domain (TD) PN suppression technology. An iterative process is implemented, in which a conventional frequency domain (FD) or TD PN suppression method is used in an initial iteration to obtain an initial estimation of the PN. OFDM signal samples are received in this initial iteration, whereby constellation symbols are generated for that initial iteration. The conventional FD or TD suppression method does not need to be used after this initial iteration. In a next iteration, the OFDM signal samples from the initial iteration are reconstructed from the constellation symbols generated in the initial iteration. An effect of the PN on the reconstructed OFDM symbol is estimated. This new estimate of the effect of the PN is used to demodulate OFDM signal samples received in this next iteration. Further iterations follow, in which OFDM signal samples received in each given iteration is reconstructed in each next iteration. A second iteration refines the estimation of the PN obtained in the initial iteration. Then, a third iteration refines the estimation of the PN obtained in the second iteration. After a few iterations, the performance of the PN estimation is no longer impacted by the quality of the initial estimation of the PN.

Figure 5:
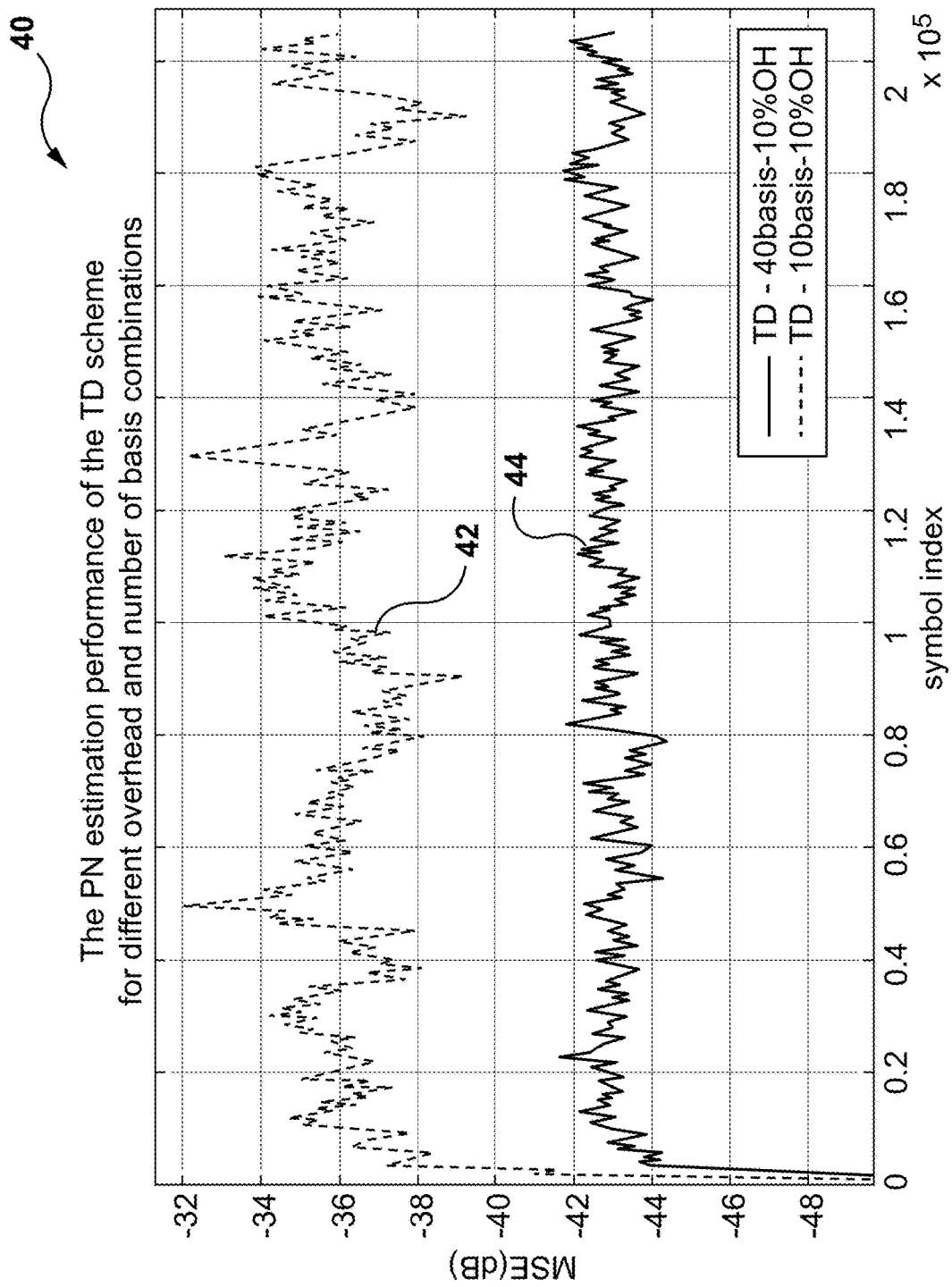
FIG. 5 is a graph comparing a performance of the PN estimation using the time domain method for different overhead and number of basis vectors combinations.

An embodiment of the present disclosure uses linear interpolation (LI) applied in the time domain (TD) (hence LI-TD) to suppress the effect of PN in the OFDM signal. LI-TD PN suppression technology allows reaching high performance, similar to that of the mean squared error (MSE) curve 44 (FIG. 5), while using similar pilot symbol overhead and number of basis vectors as used in producing the curve 42 (FIG. 5).

The LI-TD PN suppression technology is applicable in all the OFDM transmission links. The present technology may be viewed as a unified framework to battle the effects of PN in OFDM systems, whether data symbols are being transmitted from a small constellation (e.g., QPSK) or from a dense constellation (e.g., 4096-QAM).

Figure 6:
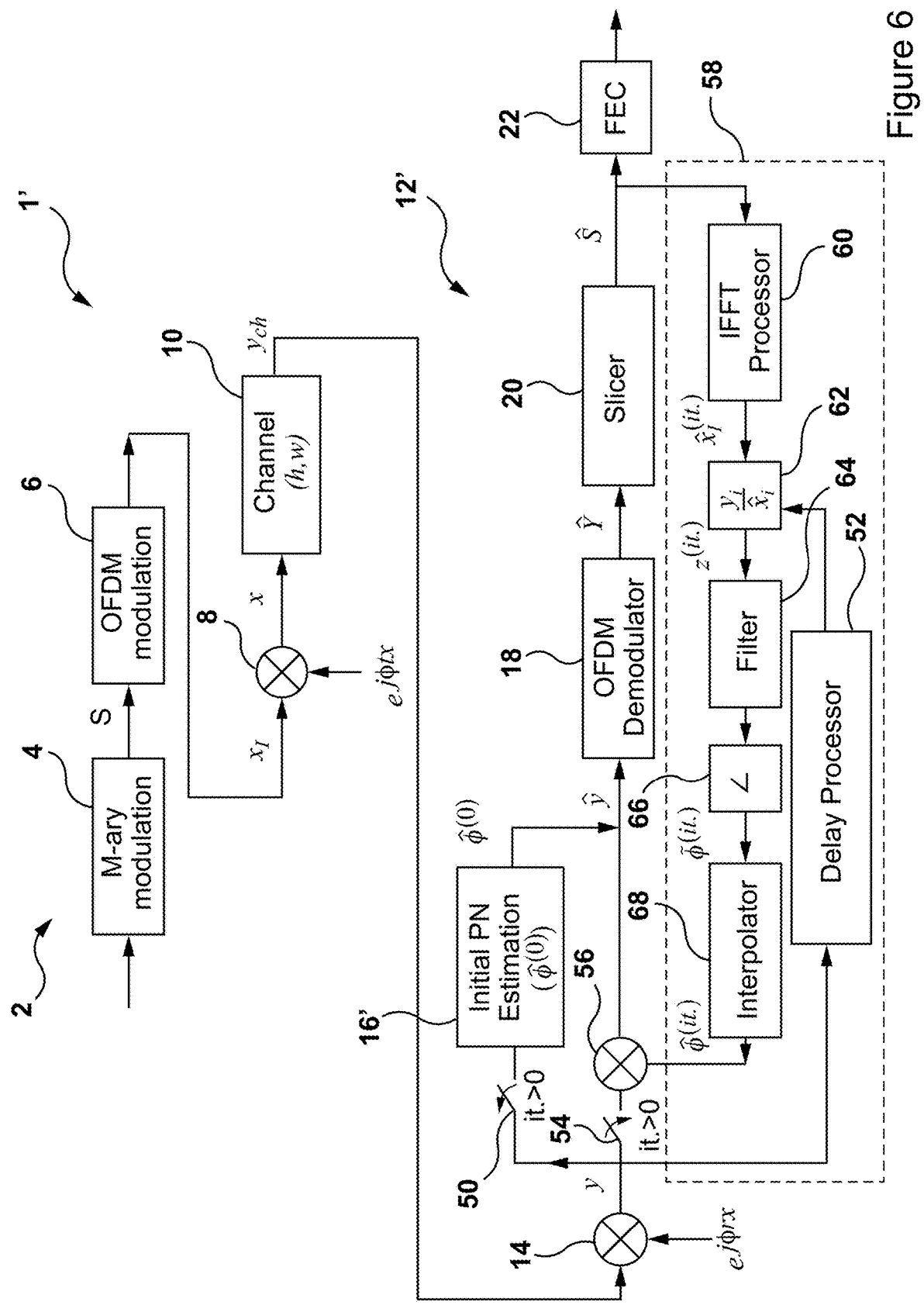
FIG. 6 is a block diagram of an OFDM network implementing a phase noise removal method according to an embodiment of the present disclosure.

FIG. 6 is a block diagram of an OFDM network implementing a phase noise removal method according to an embodiment of the present disclosure. An OFDM network 1' contains most of the same components as those of the OFDM network 1 of FIG. 3, and further contains additional components. Only the additional components will now be described in details.

Figure 3:
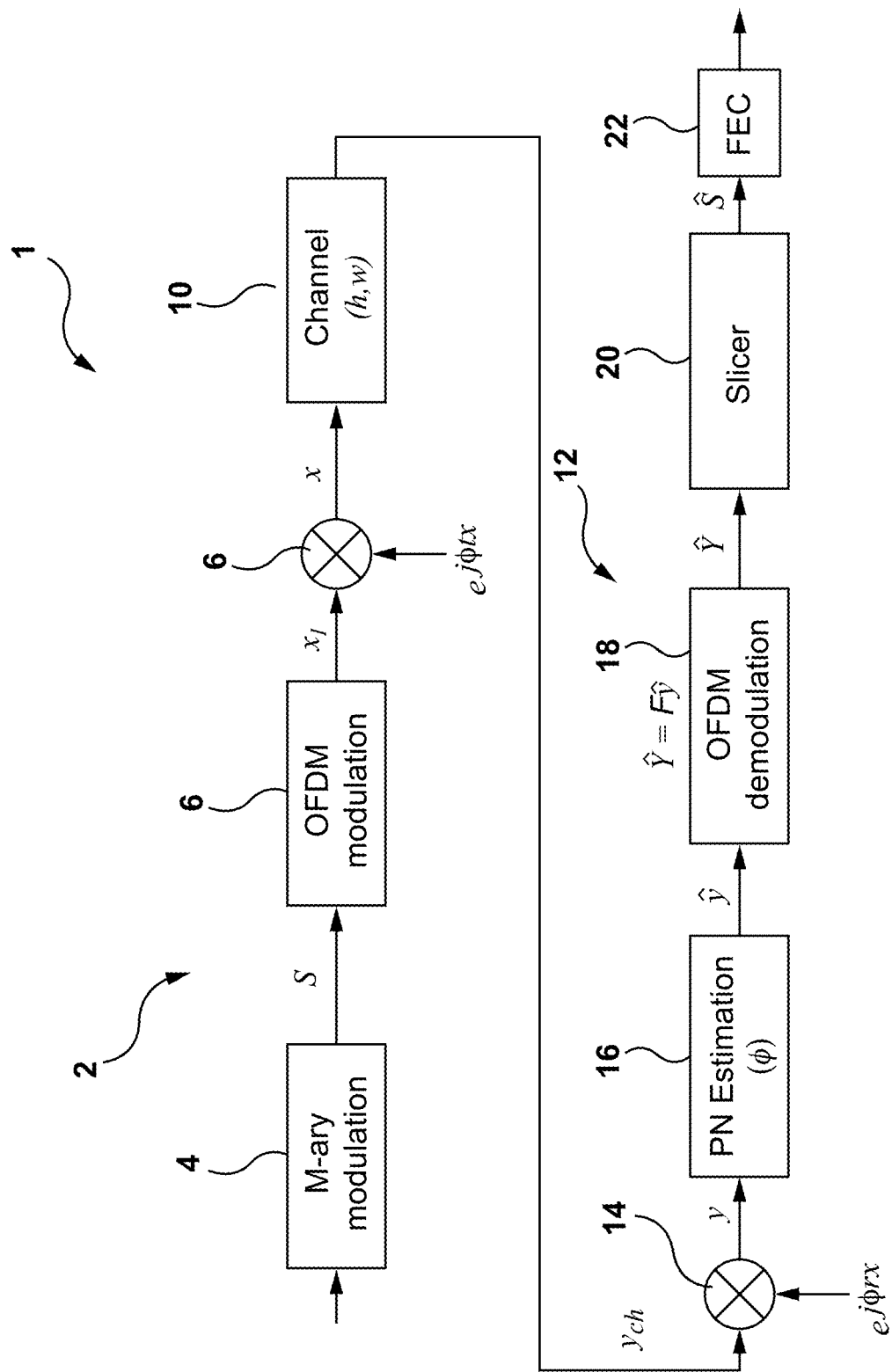
FIG. 3 is a block diagram of an OFDM network implementing a conventional time domain phase noise removal method.
Figure 4:
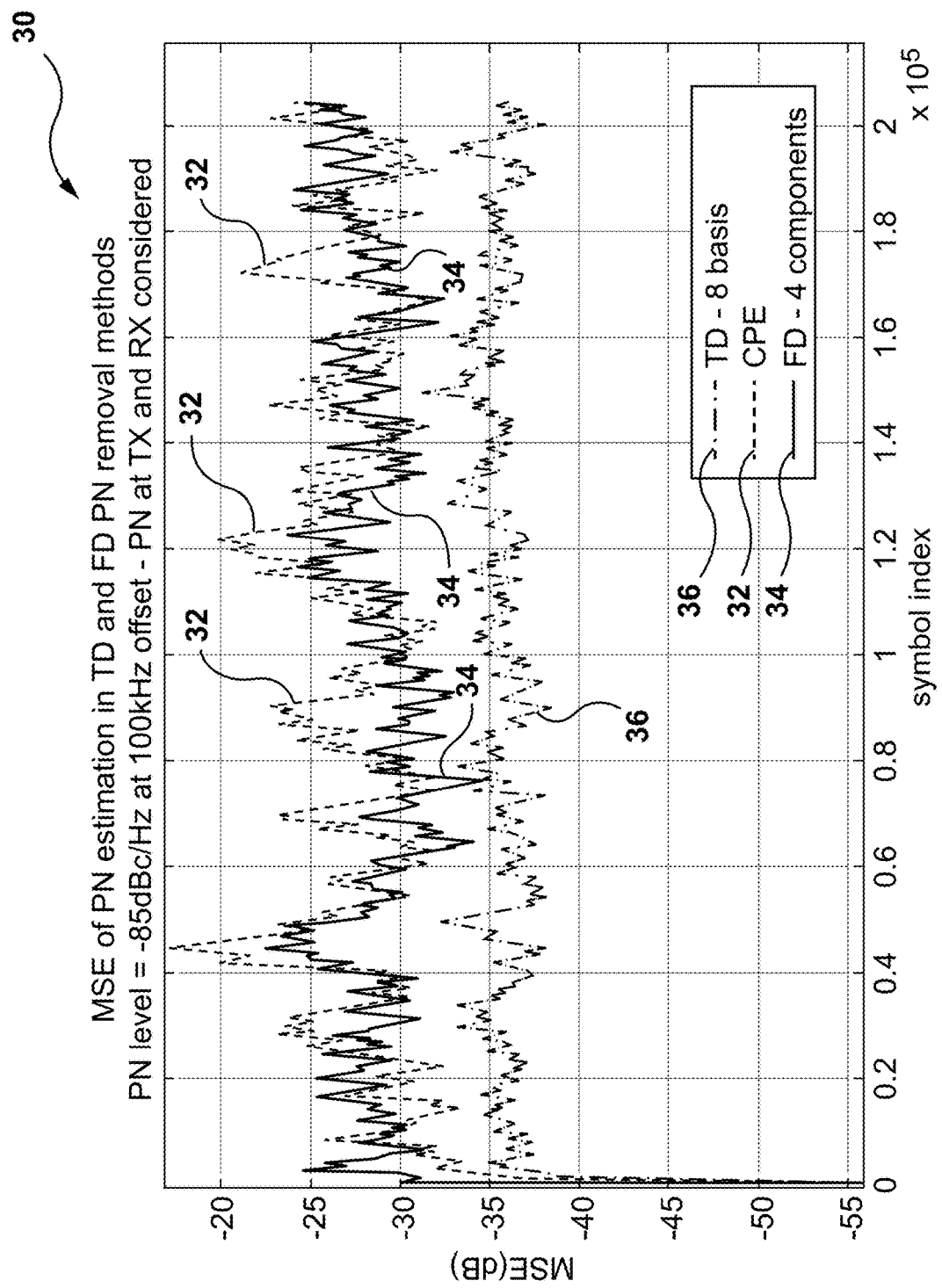
FIG. 4 is a graph comparing a performance of conventional frequency domain and time domain phase removal methods.

On a receiver side, a decoder 12' includes an initial PN estimation block 16' that may, in an embodiment, be identical to the phase noise (PN) estimation block 16 of FIG. 3 and be configured to apply the TD PN estimation method described hereinabove, or a variant thereof. Alternatively, the initial PN estimation block 16' may be configured to apply any variant of the FD PN estimation method. Regardless, in an initial iteration (iteration 0), a first switch 50, which may be implemented in hardware and/or software, directs initial samples of the OFDM signal vector y to the initial PN estimation block 16'. Independently of the position of the first switch 50, the initial samples of the OFDM signal vector y are also directed to a delay processor 52, for reasons that are described hereinbelow. The initial PN estimation block 16' calculates an initial estimation of the PN $\emptyset^{(0)}$, wherein (0) denotes this initial iteration, and uses this initial estimation of the PN $\emptyset^{(0)}$ to generate a PN-corrected estimation ŷ of the initial samples of the OFDM signal vector y. An estimation performance of the initial PN estimation block 16' may be insufficient for reaching performance goals of the OFDM network 1', particularly when the OFDM network 1' uses a high order modulation such as for example 256-QAM, 1024-QAM or 4096-QAM. Consequently, PN-corrected estimation ŷ of the initial samples of the OFDM signal vector y applied to the OFDM demodulator 18, initial OFDM signal samples Ŷ from the OFDM demodulator 18 applied to the slicer 20, and initial constellation symbols Ŝ generated by the slicer 20, may be of relatively poor quality. The forward error correction (FEC) processor 22 may not be capable of fully overcoming errors present in the initial constellation symbols Ŝ. The first switch 50 opens immediately after the completion of the initial iteration.

Starting with a next iteration (iteration >0), a second switch 54, which may also be implemented in hardware and/or software, closes and remains closed on an ongoing basis. Considering a first iteration after the initial iteration (iteration 1), the second switch 54 directs next samples of the OFDM signal vector y to a de-rotation block 56. The de-rotation block 56 forms a PN-corrected estimation ŷ as a function of a refined estimation $\hat{\emptyset}$ of the PN (calculated as explained hereinbelow) by calculating $\hat{y}=ye^{-j\hat{\emptyset}}$. These samples (as well as subsequent samples) of the OFDM signal vector y continue being directed to the delay processor 52. The constellation symbols Ŝ from the initial iteration are fed to a loop 58. In the loop 58, an Inverse Fast Fourier Transform (IFFT) operator 60 forms a reconstructed (i.e. estimated) copy $\hat{x}_I$ of initial samples of the transmitted OFDM signal vector $x_I$ using the initial constellation symbols Ŝ. The initial samples of the OFDM signal vector y have been delayed by the delay processor 52 to be time aligned with the reconstructed copy $\hat{x}_I$ and are compared therewith in an estimator 62 of the PN effect on the reconstructed samples of the OFDM signal vector. As illustrated, this comparison is obtained as a ratio $$\left(\frac{y_i}{\hat{x}_i}\right)$$

OFDM signal vector y for a given iteration i over the reconstructed copy $\hat{x}_I$ of the samples of the transmitted OFDM signal vector x for the same iteration i (in this case, the value of i is 0, given that the reconstructed copy $\hat{x}_I$ is formed by the IFFT operator 60 using the initial constellation symbols $\hat{S}$ and given that the samples of the OFDM signal vector y from the initial iteration have been delayed by the delay processor 52 to be time aligned with this reconstructed copy $\hat{x}_I$. Regardless, the estimator 62 outputs an estimated PN effect z on the reconstructed copy $\hat{x}_I$ of the samples of the OFDM signal vector y for the same iteration. The estimated PN effect z may be applied to a filter 64 that calculates a moving average of values of the estimated PN effect z on the reconstructed copy $\hat{x}_I$ of the samples of the OFDM signal vector y. An angle calculator 66 calculates an angle $\tilde{\varnothing}$ of the moving average of the values of the estimated PN effect. An interpolator 68 interpolates the angle $\tilde{\varnothing}$ of the moving average of the values of the estimated PN effect z to produce a next estimation $\hat{\varnothing}^{(1)}$ of the PN, which is more refined and accurate than the initial estimation $\varnothing^{(0)}$ produced by the initial PN estimation block 16'. The interpolator 68 may apply a linear interpolation, in which case the decoder 12' may be called a linear-interpolation time-domain (LI-TD) decoder. It is contemplated that the interpolation 68 may alternatively implement a wiener interpolation, spline interpolation, or a cubic interpolation. Regardless of the actual interpolation method, this next estimation $\hat{\varnothing}^{(1)}$ of the PN for iteration 1 is more refined and accurate than the initial estimation $\varnothing^{(0)}$ of the PN.

Following this first iteration after the initial iteration, in which the IFFT operator 60, the estimator 62, the filter 64, the angle calculator 66 and the interpolator 68 have produced the estimation $\tilde{\varnothing}$ of the PN for iteration 1, the next estimation $\hat{\varnothing}^{(1)}$ of the PN is used by the de-rotation block 56 to de-rotate the samples of the OFDM signal vector y for iteration 1 and to produce a PN-corrected estimation $\hat{y}$ of the samples of the OFDM signal vector y for iteration 1. The PN-corrected estimation $\hat{y}$ of the samples of the OFDM signal vector y is applied to the OFDM demodulator 18, which outputs OFDM signal samples $\hat{Y}$ that are applied to the slicer 20, from which constellation symbols $\hat{S}$ are obtained. These constellation symbols $\hat{S}$ are fed into the loop 58 for use by the IFFT processor 60 in a next iteration.

Only the initial iteration uses the initial PN estimation block 16'; all subsequent iterations use the components included in the loop 58. Simulations of the OFDM network 1' have shown that an optimal estimation $\hat{\varnothing}^{(i)}$ of the PN is obtained after 3 to 5 iterations. Consequently, a minimal level of errors remains in the constellation symbols $\hat{S}$ after these 3 to 5 iterations and for any subsequent iteration. Accordingly, successive constellation symbols $\hat{S}$ vectors are compared. Iterations are no longer performed when the constellation symbols $\hat{S}$ are essentially unchanged in two successive iterations. In any case, a maximum number of iterations, for example 5 iterations, may be set in order to stop execution of the loop 58. Thereafter, the estimation $\hat{\varnothing}^{(i)}$ obtained in a last iteration remains as a constant.

Additional details of the PN suppression technology implemented in the decoder 12' will now be presented. Upon sampling the channel output (y), the TD PN suppression method makes an initial estimation of the PN samples $\varnothing$. The estimated samples $\hat{\varnothing}^{(0)}$ for the initial iteration (0) are used to de-rotate the channel output and form the vector $\hat{y}$. The elements of $\hat{y}$ are sent to the OFDM demodulator and then to the M-ary demodulation block, where M is the constellation size. By getting the output of the demodulator block $\hat{S}$, the initial iteration is completed. In subsequent iterations, the present PN suppression technology comes into play. An IFFT is performed on the just produced output of the demodulator block $\hat{S}$ to get the approximated TD vector $\hat{x}_I$. Note that the vector $\hat{S}$ is equal to S, except for locations where a decision error has occurred. A vector E is made to show the error locations. Elements of E can be found according to $E_i = S_i - \hat{S}_i \forall i \leq N-1$. The estimated TD samples may be written as per equation (6):

$$\hat{x}_I = \frac{1}{N} F^H \hat{S} = \frac{1}{N} F^H (S + E) = x_I + e, \tag{6}$$

In equation (6), $e = 1/N F^H E$. Due to the IFFT operation, even a single non-zero element in the vector E will propagate through the whole vector of $\hat{x}_I$.

Using equation (2), the channel output may be written in terms of the ideal TD vector as prt equation (7):

$$y = \psi_{tot} x_I + w \tag{7}$$

In equation (7), $$x_I = \frac{1}{N} F^H S$$

is used. By dividing the elements of the channel output y by the elements of the estimated TD vector $\hat{x}_I$, the vector z is formed. The elements of z may be written as per equation (8):

$$z_i = \frac{y_i}{\hat{x}_{I_i}} = e^{j\Phi_i} \frac{x_{I_i}}{\hat{x}_{I_i}} + \frac{w_i}{\hat{x}_{I_i}} = \alpha_i e^{j\Phi_i} + \beta_i, 0 \leq i \leq N-1 \tag{8}$$

It may be noted that since the focus of the present PN suppression technology is on the effects of the PN, and since the channel matrix does not play any role throughout the present PN suppression technology, the present discussion only considers an additive white Gaussian noise (AWGN) channel model. For any other channel model, replacing a corresponding channel convolution matrix (obtained through a channel estimation block) into the above equations provides a straightforward extension of the present disclosure.

Extracting the estimates of $\varnothing_i$ from $z_i$ elements is based on a statistical behavior of the multiplicative term $\alpha$ and an additive term $\beta$. Investigating equation (8) reveals that $E[z_i] = E[\alpha_i] E[e^{j\Phi_i}] + E[\beta_i]$, in which $E[X]$ is the expectation of the random variable X. Since $\beta_i$ includes the AWGN term, then $E[\beta_i] = 0$. With respect to $\alpha_i$, the expectation formula is an involved expression; it may be shown that, under certain conditions, the approximation shown in the following equation (9) holds:

$$E\left[\frac{x_I(k)}{\hat{x}_I(k)}\right] \approx \tag{9}$$

Pr[no symbol error at the SNR equivalent to the iteration 0]

Equation (9) holds when the initial PN estimation is sufficiently accurate, such that the probability of error moves away from 1, for example, a probability of error less than $10^{-1}$. Under this condition, $$E\left[\frac{x_I(k)}{\hat{x}_I(k)}\right] \to 1$$

and the expectation of $z_i$ is approximated by the expectation of the PN samples, i.e., $E[z_i] \approx E[e^{j\varnothing_i}]$.

A common approach in finding the mean of a set of samples is to use a moving average. In the present case, a moving average of the estimated PN is used with a small window size, having for example less than 20 values. This maximum window size has been found empirically and through simulations. By finding the angle of the moving average, a raw estimate of the PN samples, shown as $\tilde{\emptyset}_i$ on FIG. 6, is also found. It should be observed that $\tilde{\emptyset}_i$ cannot be directly used as a second estimate of $\emptyset_i$ because, at some locations, the estimate is far from perfect. However, many locations of $\tilde{\emptyset}_i$ have good accuracy. To exploit this property and find a second estimate, which is improved in not only some locations but all the N samples, a linear interpolation between the obtained $\tilde{\emptyset}_i$ samples is used. By this interpolation, a smoother estimate of the PN samples may be found and, at the same time, small changes in the PN may be followed. Results of the interpolation are reliable PN estimates $\hat{\emptyset}_i^{(it.)}$ where (it.) indicates the iteration index, which are found using the present PN suppression technology. The estimates $\hat{\emptyset}_i^{(it.)}$ are used to de-rotate the elements of the channel output y to produce an updated $\hat{y}$ vector, which is then applied to the OFDM demodulation block and finally to the slicer to form the updated $\hat{S}$ vector. Next iterations then follow from this point.

If the initial PN estimation is sufficient for equation (9) to hold, next iterations result in more accurate estimates of the PN and more reliable $\hat{S}$ vectors. However, an increasing number of iterations does not necessarily mean a continuously improving estimation accuracy. Since the LI-TD PN suppression technology does not rely on an FEC output, the improvement in the reliability of the vector $\hat{S}$ is limited. This limit is determined by the error correcting capability of the M-ary demodulator, which works according to a minimum distance criterion. Without using the moving average block and the linear interpolation block, the performance may not be optimal. However, adding the post processing that is performed on the $z_i$ samples may to a large extent compensate for the shortcoming of the M-ary modulator in correcting the existing errors in the vector $\hat{Y}$.

By inputting the demodulation results in the feedback loop without relying on FEC, the processing delay of the present PN suppression technology decreases significantly when compared to other methods. Moreover, it becomes possible to include variable iteration numbers for each OFDM symbol. A fixed number of iteration for all the OFDM symbols is not required. The maximum number of iterations may be selected based on the basis of computational complexity and of processing delay. The number of iterations may be selected on the following basis.

In each iteration, the estimate of S, which is, $\hat{S}$, is found and replaced in equation (6) and the resulting approximated TD vector $\hat{x}_I$ is introduced in equation (8) for further processing. Other parameters in equation (9) do not change in different iterations. As the error correcting capability of the demodulator is constant, it is possible to determine whether the demodulator has reached its error correcting capability by comparing the estimated data vector in a given iteration $\hat{S}^{(it.)}$ with the estimated data vector in a next iteration $\hat{S}^{(it.-1)}$ (for it.>1). If $\hat{S}^{(it.)}$ and $\hat{S}^{(it.-1)}$ are identical, further iterations would not be beneficial because none of the involved parameters in the present PN suppression technology would change. As will be shown in simulation results presented hereinbelow, the present PN suppression technology operates with less iterations when the SNR of the input signal is high and/or when the initial estimation has good accuracy. It is possible to execute more iterations to overcome the effect of a poor initial PN estimation that may for example be due to a low pilot symbol overhead. There is thus a trade-off between the quality of the initial estimation and the number of iterations for reaching a PN estimation performance target. The present PN suppression technology makes it possible to maintain a small pilot symbol overhead by increasing the number of iterations to compensate the effect of a strong PN. It has been found empirically and through extensive simulation that the only requirement is to keep the pilot overhead used in the initial iteration such that the initial PN estimation performance is better than when only the CPE removal is used. Of note, a similar constraint is generally required by conventional PN suppression methods that aim at surpassing the performance of CPE removal.

It may be noted that the estimations produced by the present PN estimation technology does not use any matrix inversion, except in the initial iteration that relies on a conventional PN suppression method. Pilot symbol overhead is only used in the initial iteration so the overhead may be limited, at small expense of a potentially lower quality of the initial PN estimation and the need for a few additional iterations. Calculations of the moving average and the of linear interpolation only use modest processing resources. Given that the PN suppression is performed on the OFDM signal vector on a symbol by symbol basis, before the application of FEC, there is no buffering requirement and no significant latency is introduced by the decoder 12'.

Figure 7:
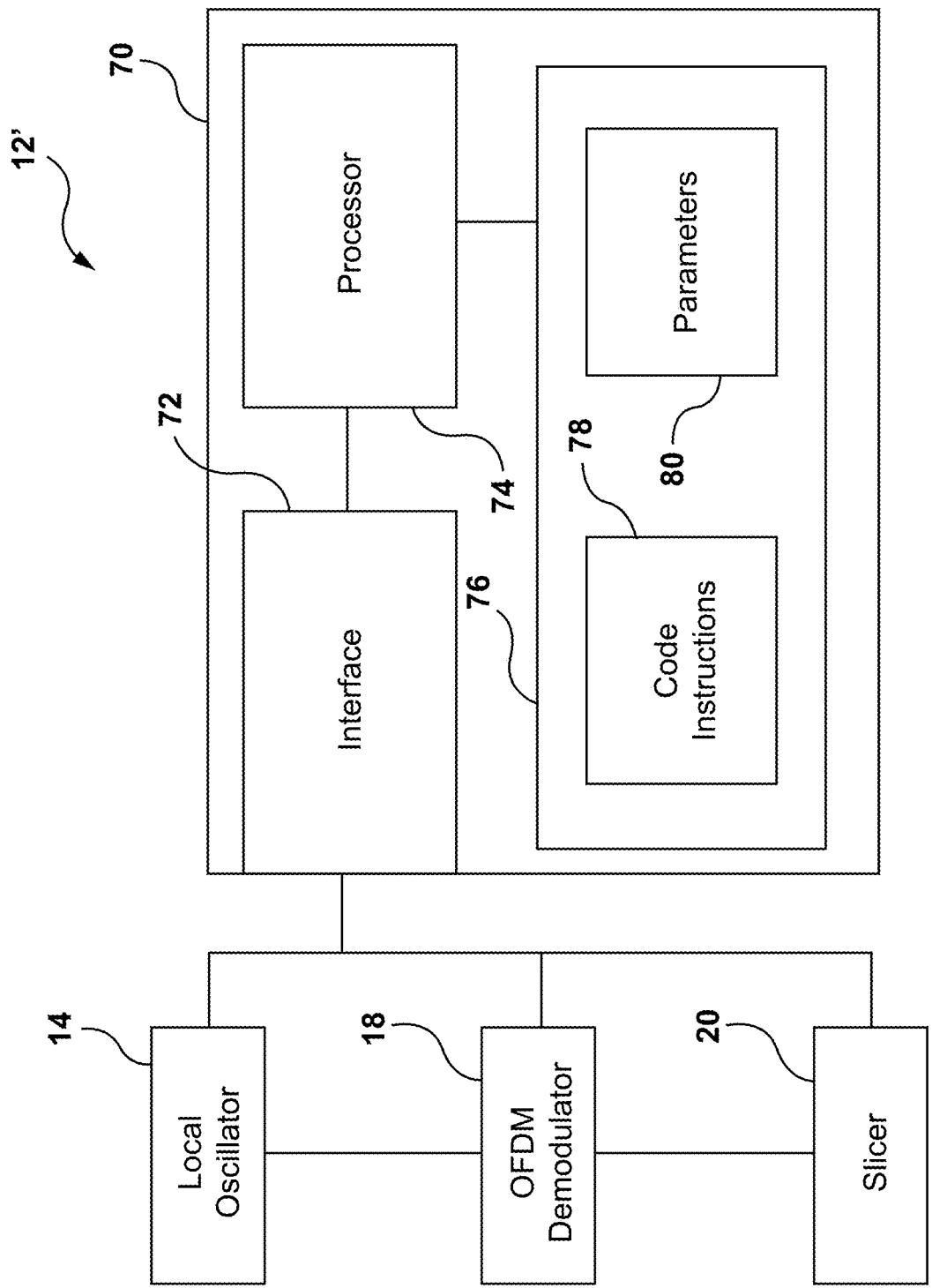
FIG. 7 is a block diagram of an OFDM decoder according to an embodiment of the present disclosure.

FIG. 7 is a block diagram of an OFDM decoder according to an embodiment of the present disclosure. The decoder 12' includes the previously described receive-side local oscillator (LO) 14, OFDM demodulator 18 and slicer 20, as well as a processing unit 70. In an embodiment, the processing unit 70 may implement the functions of the initial PN estimation block 16', the first switch 50, the delay processor 52, the second switch 54, the de-rotation block 56 and of all components of the loop 58, and may further implement the features of the FEC processor 22. The processing unit 70 includes one or more interfaces (one interface 72 is shown for simplicity) adapted to receive samples of the OFDM signal vector y from the receive-side LO 14, to direct PN-corrected estimations 9 of the samples of the OFDM signal vector y to the OFDM demodulator 18, and to receive constellation symbols $\hat{S}$ generated by the slicer 20. The interface 72 communicates with one or more processors (one processor 74 is shown for simplicity). The processing unit 70 further includes one or more memory devices (one memory device 76 is shown for simplicity). The memory device 76 comprises a non-transitory computer readable medium 78 having stored thereon computer executable instructions that, when executed, cause the processor 74 to perform the operations of one or more of the initial PN estimation block 16', the first switch 50, the delay processor 52, the second switch 54, the de-rotation block 56, the IFFT processor 60, the estimator 62, the filter 64, the angle calculator 66, the interpolator 68 and the FEC processor 22. The memory 76 may further contain a set 80 of parameters related to the operation of the decoder 12'.

In more details, the decoder 12' is configured to suppress phase noise in an OFDM signal. The receive-side LO 14 converts the OFDM signal to an OFDM signal vector. When supplied with a PN estimation, the OFDM demodulator 18 demodulates the OFDM signal vector to produce demodulated samples of the OFDM signal vector. The OFDM demodulator 18 may comprise a Fast Fourier Transform (FFT) processor. The OFDM demodulator 18 may integrate the de-rotation block 18 that uses the supplied phase noise estimation to de-rotate samples of the OFDM signal vector.

The slicer generates constellation symbols from the demodulated samples of the OFDM signal vector. In an initial iteration, the processing unit 70 produces an initial estimation of the phase noise in initial samples of the OFDM signal vector and supplies this initial estimation of the phase noise to the OFDM demodulator for demodulation and PN-correction of the OFDM signal. In one or more additional iterations, the processing unit 70 calculates an Inverse Fast Fourier Transform (IFFT) of constellation symbols generated in a preceding iteration to reconstruct samples of the OFDM signal vector demodulated in the preceding iteration, estimates a phase noise effect on the reconstructed samples of the OFDM signal vector, produces a next estimation of the phase noise in next samples of the OFDM signal vector based on the estimated phase noise effect on the reconstructed samples of the OFDM signal vector, and supplies the next estimation of the phase noise to the OFDM demodulator for demodulation and PN-correction of the OFDM signal.

In one or more embodiments, the processing unit 70 implements the delay processor 52 that applies a time delay to the OFDM signal vector to align the samples of the OFDM signal vector from the preceding iteration with the samples of the reconstructed OFDM signal vector. In the same or other embodiments, the processing unit 70 implements the IFFT processor 60 that reconstructs the samples of the OFDM signal vector demodulated in the preceding iteration. The processing unit 70 may also implement the estimator 62 that calculates the phase noise effect on the reconstructed samples of the OFDM signal vector based on comparing samples of the OFDM signal vector from the preceding iteration with the reconstructed samples of the OFDM signal vector. The processing unit 70 may further implement the filter 64 that calculates the moving average of values of the estimated phase noise effect on the reconstructed samples of the OFDM signal vector, the angle calculator 66 that calculates an angle of the moving average of the values of the estimated phase noise effect, and the interpolator 68 that interpolates the angle of the moving average of the values of the estimated phase noise effect, the interpolator producing the next estimation of the phase noise. Given that the OFDM signal may contain FEC information, the processing unit 70 may also implement the FEC processor 22 and use the FEC information, after suppressing the phase noise in the samples of the OFDM signal vector, to correct data errors present in the constellation symbols.

Some of the features of the decoder 12', for example and without limitation the FEC processor 22, the delay processor 52, the first and second switches 50 and 54, and the de-rotation block 56 may alternatively be implemented as separate hardware or software devices.

It is to be understood that the operations and functionality of the described decoder 12', constituent components, and associated processes may be achieved by any one or more of hardware-based, software-based, and firmware-based elements. Such operational alternatives do not, in any way, limit the scope of the present disclosure.

Figure 8A:
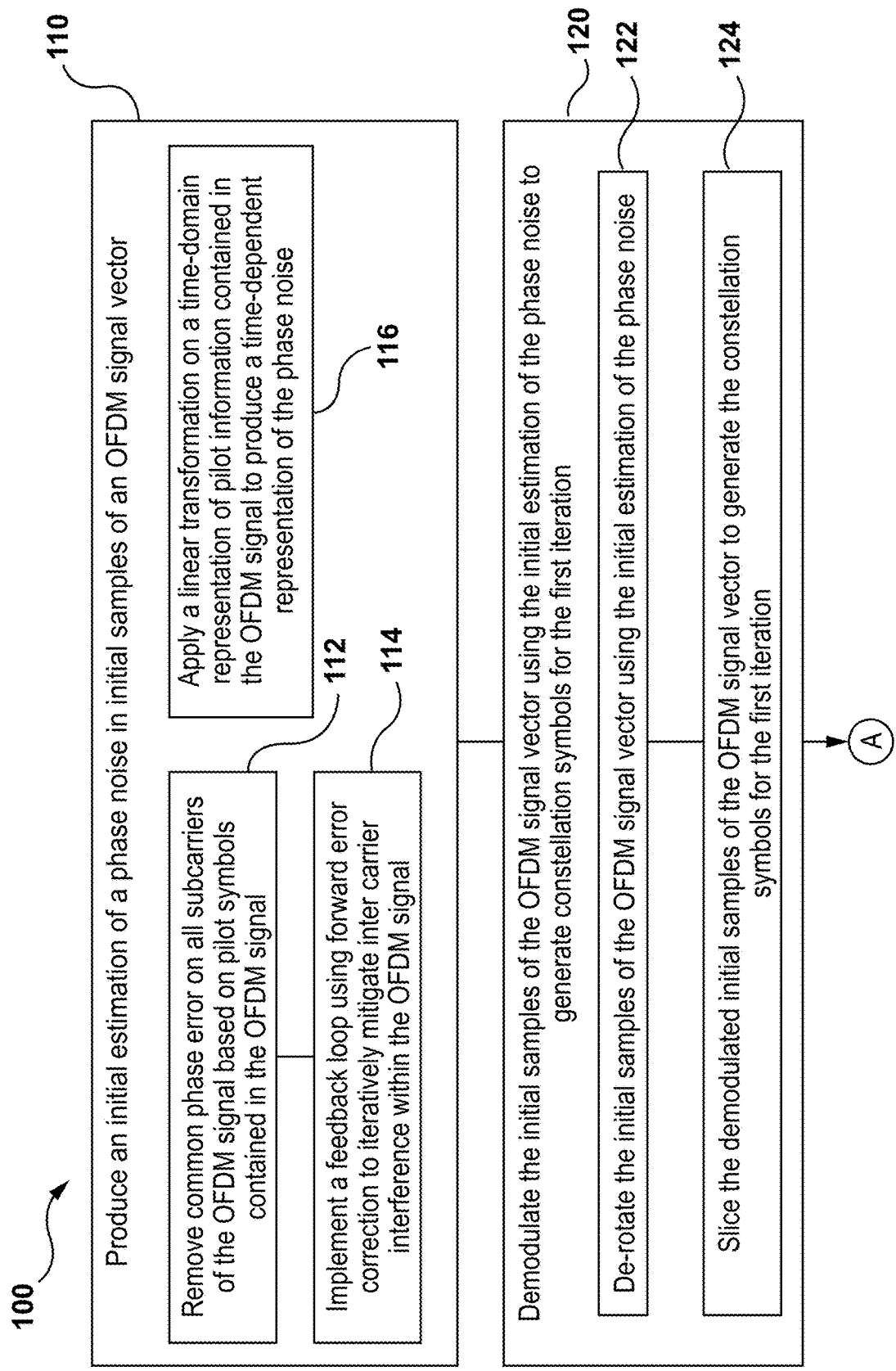
FIGS. 8a, 8b and 8c collectively show a sequence diagram showing operations of a method for suppressing phase noise in an OFDM signal according to an embodiment of the present disclosure.
Figure 8B:
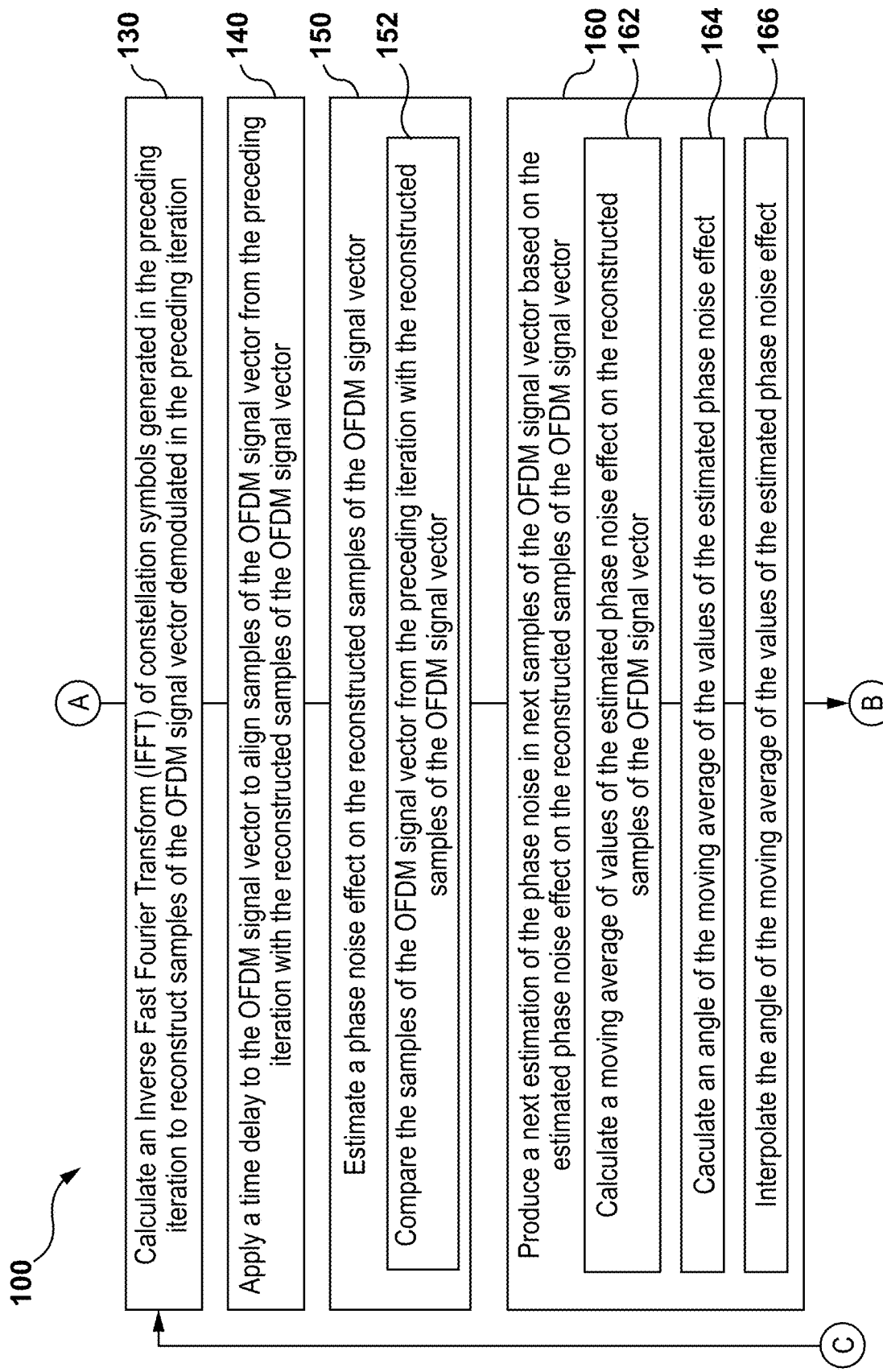
Figure 8C:
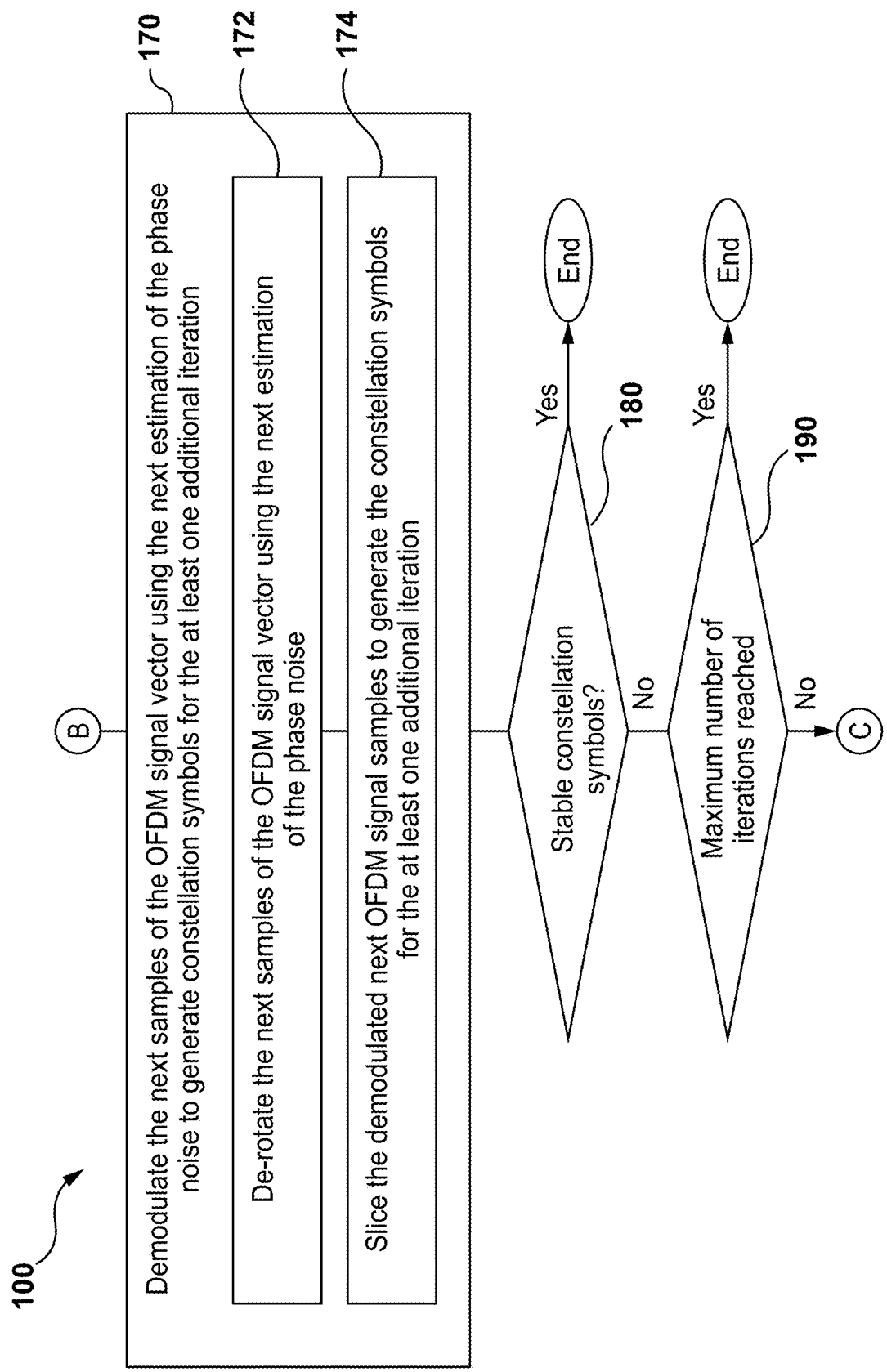

FIGS. 8a, 8b and 8c collectively show a sequence diagram showing operations of a method for suppressing phase noise in an OFDM signal according to an embodiment of the present disclosure. On FIGS. 8a, 8b and 8c, a sequence 100 comprises a plurality of operations, some of which may be executed in variable order, some of the operations possibly being executed concurrently, some of the operations being optional. The sequence 100 begins on FIG. 8a with an initial iteration of the method, in which operation 110 comprises the production of an initial estimation of the PN in initial samples of an OFDM signal vector. Several variants of the operation 110 may be contemplated. In some variants, the initial estimation of the PN is produced in the frequency domain (FD). In one FD example, operation 110 comprises sub-operations 112 and 114. At sub-operation 112, a common phase error is removed on all subcarriers of the OFDM signal based on pilot symbols contained in the OFDM signal. Then at sub-operation 114, a feedback loop using FEC is implemented to iteratively mitigate intercarrier interference within the OFDM signal. In other variants, the initial estimation of the PN is produced in the time domain (TD). In one TD example, operation 110 comprises sub-operation 116 in which a linear transformation is applied on a time-domain representation of pilot information contained in the OFDM signal to produce a time-dependent representation of the PN.

Regardless of the method used to produce of the initial estimation of the PN in the initial samples of an OFDM signal vector, the initial samples of the OFDM signal vector is demodulated at operation 120 using the initial estimation of the PN to generate constellation symbols for the initial iteration. In this operation, the constellation size may be any one of 2, 4, 8, 16, 32, 64, 128, 256, 512, 1024, 2048 and 4096. Operation 120 may comprise one or more of sub-operations 122 and 124. At sub-operation 122, the initial samples of the OFDM signal vector are de-rotated using the initial estimation of the PN. Sub-operation 124 comprises slicing the demodulated initial samples of the OFDM signal vector to generate the constellation symbols for the initial iteration.

Considering now FIG. 8b, the sequence 100 continues with one or more additional iterations of the method. Considering a current iteration, an Inverse Fast Fourier Transform (IFFT) of constellation symbols generated in a preceding iteration is calculated at operation 130 to reconstruct samples of the OFDM signal vector demodulated in the preceding iteration. Without limitation, operation 130 may calculate the IFFT of the constellation symbols generated in an iteration that immediately precedes a current iteration. A time delay may be applied at operation 140 to the OFDM signal vector to align the samples of the OFDM signal vector from the preceding iteration with the samples of the OFDM signal vector as reconstructed at operation 130. A magnitude of the time delay may be selected based on the preceding iteration being the immediately preceding iteration, or an earlier iteration. A PN effect on the reconstructed samples of the OFDM signal vector is estimated at operation 150. In an embodiment, the estimation of the PN effect comprises sub-operation 152, in which samples of the OFDM signal vector from the preceding iteration is compared with the reconstructed samples of the OFDM signal vector. Several manners performing sub-operation 152 may be contemplated. A difference of the OFDM signal vector from the preceding iteration and of the reconstructed samples of the OFDM signal vector may be calculated. A ratio of the OFDM signal vector from the preceding iteration over the reconstructed samples of the OFDM signal vector may be calculated. A ratio of the reconstructed samples of the OFDM signal vector over the OFDM signal vector from the preceding iteration may be calculated.

A next estimation of the PN in next samples of the OFDM signal vector is produced, at operation 160, based on the estimated PN effect on the reconstructed samples of the OFDM signal vector. In an embodiment, operation 160 may comprise one or more of sub-operations 162, 164, 166. At sub-operation 162, a calculation is made of a moving average of values of the estimated PN effect on the reconstructed samples of the OFDM signal vector. The moving average may be calculated over a window size in a range of 5 to 50 values of the estimated PN effect. An angle of the moving average of the values of the estimated PN effect is calculated at sub-operation 164. At sub-operation 166 the angle of the moving average of the values of the estimated PN effect is interpolated. Without limitation, the interpolation may be a linear interpolation, a wiener interpolation, spline interpolation, or a cubic interpolation. When a linear interpolation of the moving average of the values is made, the method illustrated in the sequence 100 may be called a linear-interpolation time-domain (LI-TD) PN suppression method.

Continuing on FIG. 8c, after operation 160, the next samples of the OFDM signal vector for the current iteration are demodulated, at operation 170, using the next estimation of the PN in the OFDM signal to generate constellation symbols for the at least one additional iteration. Operation 170 may comprise one or more of sub-operations 172 and 124. At sub-operation 172, the next samples of the OFDM signal vector are de-rotated using the next estimation of the PN. Sub-operation 174 comprises slicing the demodulated next samples of the OFDM signal vector to generate the constellation symbols for the next iteration.

After execution of operation 170 in the current iteration, the sequence 100 may continue with another iteration. A test at operation 180 determines whether the generated constellation symbols in the current iteration, at operation 170, are essentially unchanged from constellation symbols generated in a previous iteration. If the generated constellation symbols are stable between the preceding and the current iteration, meaning that a difference between the constellation symbols generated in the current iteration and those generated in a preceding iteration do not differ by more than a predetermined margin, the sequence 100 ends. The sequence 100 also ends if a test at operation 190 indicates that a predetermined maximum number of iterations, for example 5 iterations, has been reached. If a difference between the constellation symbols generated in the current iteration and the constellation symbols generated in the preceding iteration is greater than a predetermined margin and if a predetermined maximum number of iterations has not been reached the sequence 100 returns to operation 130 for a new iteration, in which an IFFT of the constellation symbols that have just been generated at operation 170 is calculated to reconstruct the samples of the OFDM signal vector that has just been demodulated. A phase noise effect on these just reconstructed samples may be estimated in operation 150 for the new iteration. That phase noise effect is then used at operation 160 to determine yet another estimation of the PN in other samples of the OFDM signal vector so that other samples of the OFDM signal vector can be demodulated at operation 170.

It will be appreciated that operations of the sequence 100 may also be performed by computer programs, which may exist in a variety of forms both active and inactive. Such as, the computer programs may exist as software program(s) comprised of program instructions in source code, object code, executable code or other formats. Any of the above may be embodied on a computer readable medium, which include storage devices and signals, in compressed or uncompressed form. Representative computer readable storage devices include conventional computer system RAM (random access memory), ROM (read only memory), EPROM (erasable, programmable ROM), EEPROM (electrically erasable, programmable ROM), and magnetic or optical disks or tapes. Representative computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general.

Figure 9:
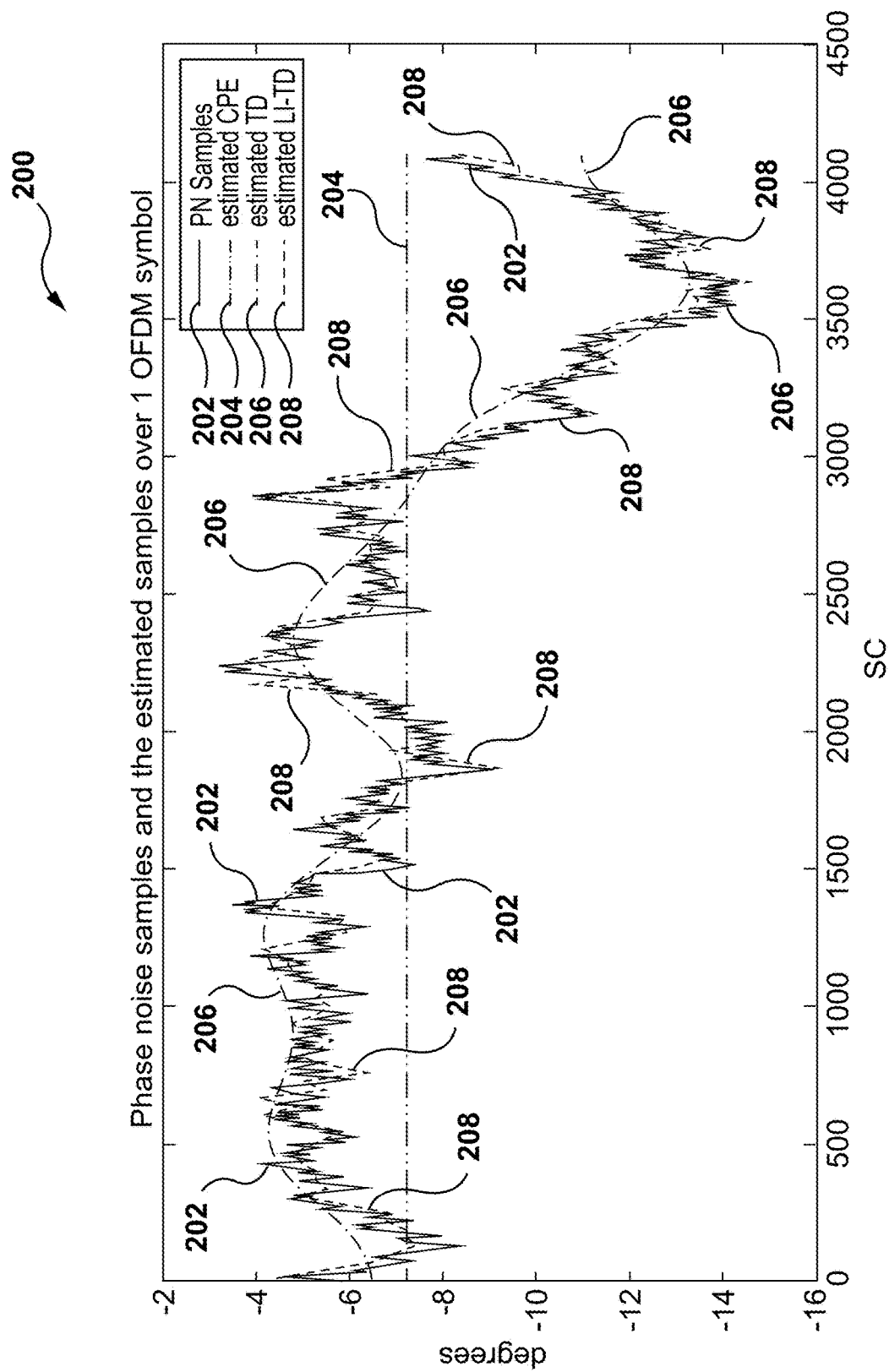
FIG. 9 is a graph showing phase noise samples and estimates thereof obtained using the conventional common phase error removal and time domain phase suppression methods as well as the phase noise removal method introduced in FIG. 6.

FIG. 9 is a graph showing phase noise samples and estimates thereof obtained using the conventional common phase error removal and time domain phase suppression methods as well as the phase noise removal method introduced in FIG. 6. On a graph 200, the PN is expressed in degrees, on a vertical axis, as a function of an index of subcarriers (SC) of the OFDM signal, on a horizontal axis. PN samples and estimated PN samples are compared on a single sample basis. Table I shows the simulation parameters used for producing the graph 200.

TABLE I

| | |
|---|---|
| Constellation size/type | 256-QAM |
| Signal to Noise Ratio (SNR) | 32 dB |
| TX side PN level (@ 100 kHz offset from the carrier) | −85 dBc |
| RX side PN level (@ 100 kHz offset from the carrier) | −85 dBc |
| Pilot spacing | 100 |
| Pilot overhead | 1% |
| Moving average window size | 25 |
| Interpolation period | 10 |
| Number of simulated OFDM symbols | 500 |
| Number of active sub-carriers | 3300 |
| FFT size | 4096 |
| BW | 400 MHz |
| Number of basis vectors in the initial estimation | 10 |
| Maximum number of iterations | 5 |

A PN curve 202 shows actual values of PN samples. Given that common phase error (CPE) removal operates similarly on all SCs, a PN curve 204 is in fact a straight line that provides a same estimate of the PN for all SCs. A PN curve 206 shows the moderate efficiency of the conventional TD PN suppression method in tracking the actual values of the PN samples, failing to actually track small changes in the PN. In contrast, a PN curve 208 illustrates the very good accuracy of the LI-TD PN suppression method in tracking the actual values of the PN samples.

Figure 10:
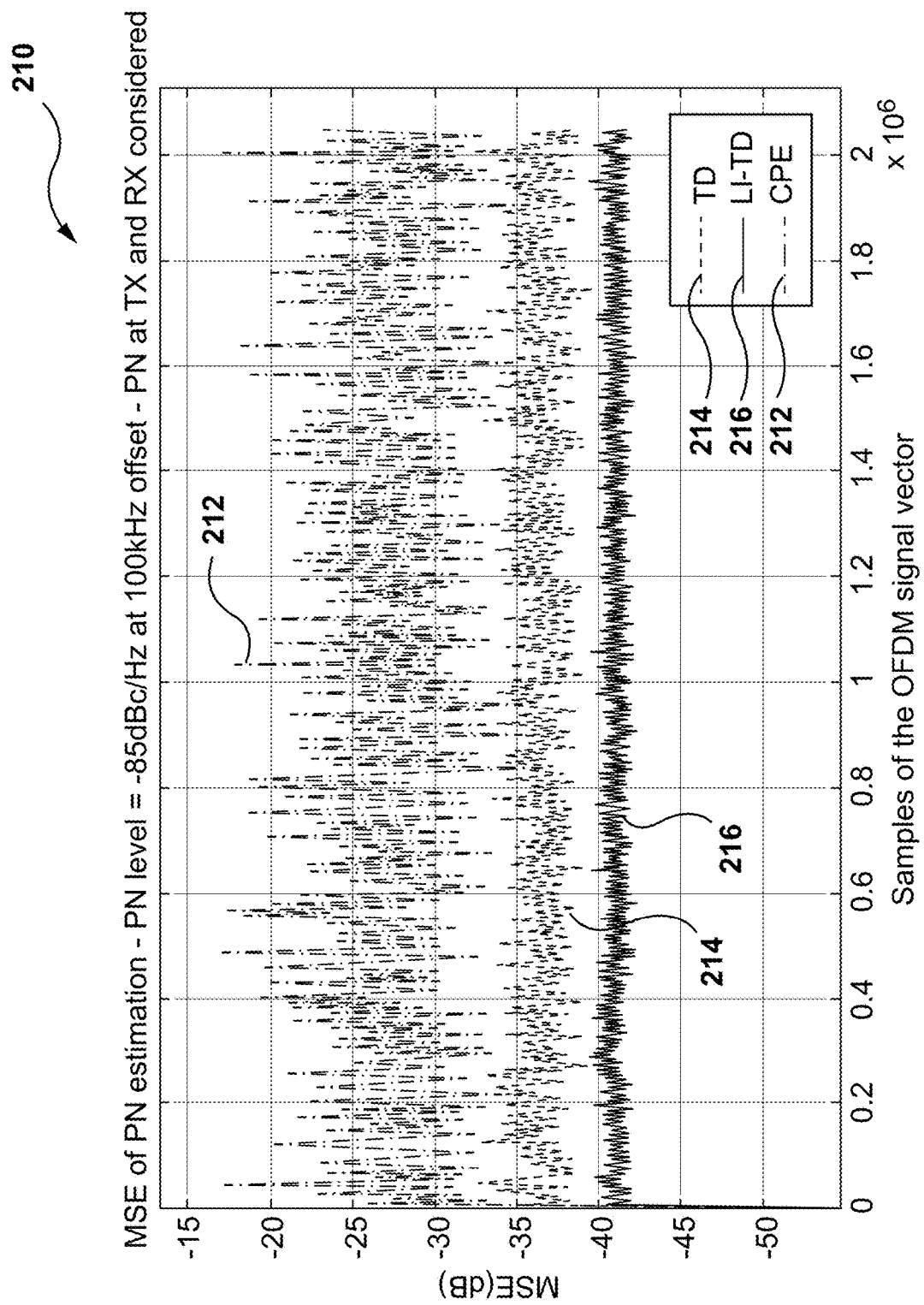
FIG. 10 is a graph showing a performance of various PN estimation methods for a 256-QAM constellation.

FIG. 10 is a graph showing a performance of various PN estimation methods for a 256-QAM constellation. On a graph 210, a performance of the PN estimation methods is expressed as a MSE in dB, on a vertical axis, as a function of samples of the OFDM signal vector, on a horizontal axis. PN introduced by the LOs at both the transmitter (TX) and receiver (RX) sides is considered. A MSE curve 212 shows that the performance is poor and varies significantly between symbols when CPE removal is used. A MSE curve 214 shows that the performance of the conventional TD PN suppression method is better than CPE removal. A MSE curve 216 shows a much improved and consistent performance when the LI-TD suppression method is used. These results are consistent over the 500 simulated OFDM symbols mentioned in Table I.

Figure 11:
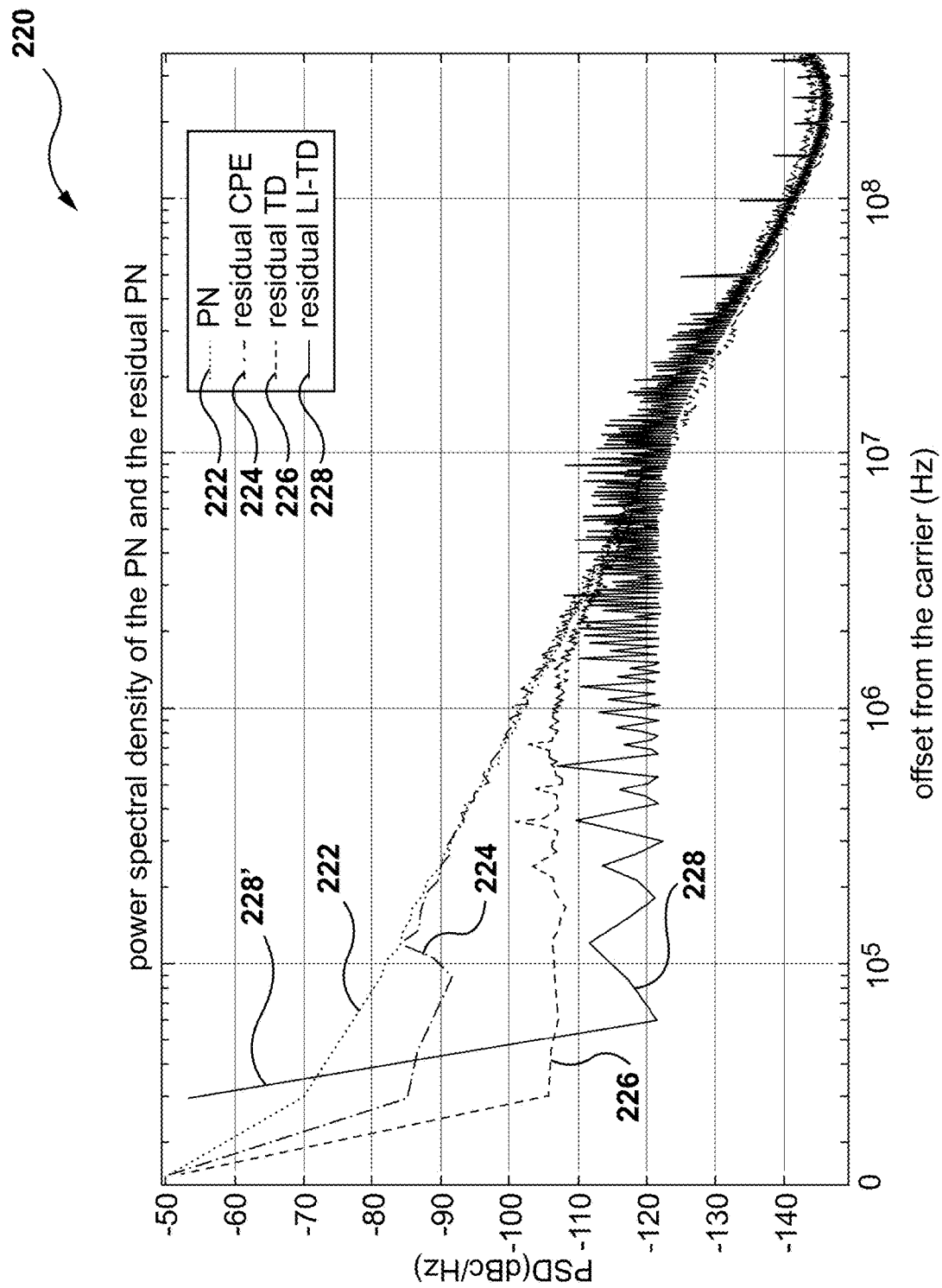
FIG. 11 is a graph showing power spectral densities of phase noise, for a 256-QAM constellation using the conventional common phase error removal and time domain phase suppression methods as well as the phase noise removal method introduced in FIG. 6.

FIG. 11 is a graph showing power spectral densities of phase noise, for a 256-QAM constellation using the conventional common phase error removal and time domain phase suppression methods as well as the phase noise removal method introduced in FIG. 6. On a graph 220, a power spectral density (PSD) of the PN is shown on a vertical axis and an offset from the signal carrier is shown on a horizontal axis. A curve 222 shows the PSD of the actual PN, a curve 224 shows a PSD of the remaining PN after CPE removal, a curve 226 shows a PSD of the remaining PN when using the conventional TD PN suppression method and a curve 228 shows a PSD of the remaining PN when using the LI-TD PN suppression method. Curve 228 shows the much better performance of the LI-TD PN suppression method. It may be noted that, for very low frequency offsets from the carrier, a section 228' of the curve 228 appears to indicate an inferior performance of the LI-TD PN suppression method. In fact, this section 228' is an artefact from the simulation process used to produce the graph 220, this simulation process being inaccurate for very low offset frequencies below about 60 kHz.

Figure 12:
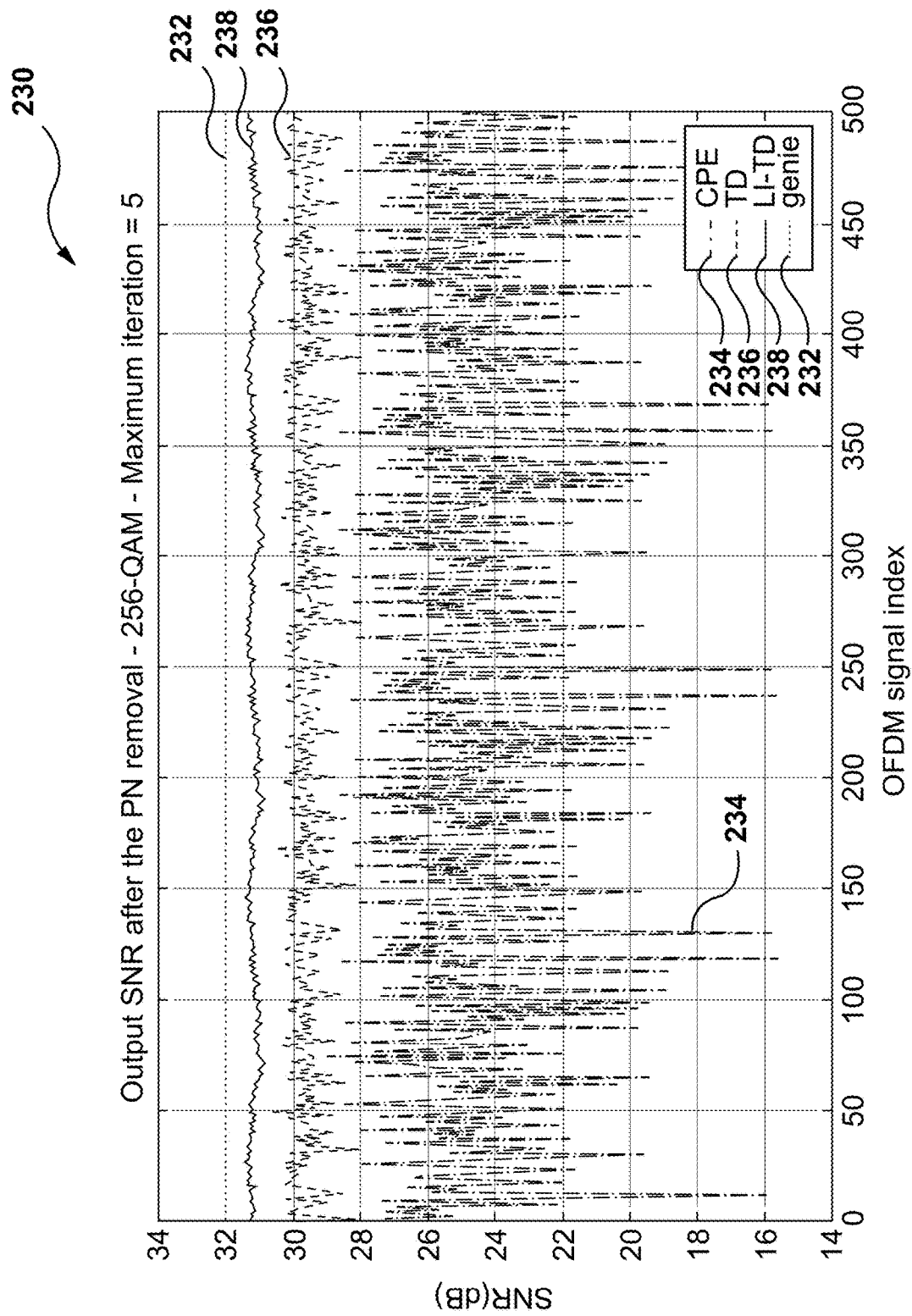
FIG. 12 is a graph showing signal to noise ratio performance, for a 256-QAM constellation using the conventional common phase error removal and time domain phase suppression methods as well as the phase noise removal method introduced in FIG. 6.

A SNR of the demodulated signals after PN suppression is the best indicator of the performance of any PN suppression method. FIG. 12 is a graph showing signal to noise ratio performance, for a 256-QAM constellation using the conventional common phase error removal and time domain phase suppression methods as well as the phase noise removal method introduced in FIG. 6. A graph 230 shows an average output SNR of the demodulated signals, on a vertical axis, as a function of an OFDM symbol index, on a horizontal axis. The results shown on the graph 230 were obtained using the parameters of Table I. A curve 232 shows a theoretical maximum SNR that would be obtained using a so-called "genie" (impossible) PN suppression algorithm capable of removing all PN effects. A curve 234 shows the SNR obtained using CPE removal only. A curve 236 shows the SNR obtained using the conventional TD suppression method. A curve 238 shows the SNR obtained using the LI-TD suppression method. The LI-TD suppression method is almost as good as the genie algorithm and provides a significant improvement over the CPE removal method and the conventional TD suppression method. 3.1 iterations on average were used in the simulations.

Table II provides a comparison of the average and minimum SNR values for the 256-QAM constellation using various PN estimation methods. Table II shows an increase of minimum values for the output SNR, which are important when using adaptive coding and modulation (ACM), as is frequently the case in many practical systems.

TABLE II

| Applied method | Average output SNR (dB) | Minimum output SNR (dB) |
| --- | --- | --- |
| No PN removal | −1.9 | — |
| CPE only | 24.6 | 15.6 |
| TD | 29.6 | 28 |
| LI-TD | 31.1 | 30.8 |

Just like the graphs of FIGS. 10, 11 and 12, Table II also provides information related to the use of a 256-QAM constellation.

Figure 13:
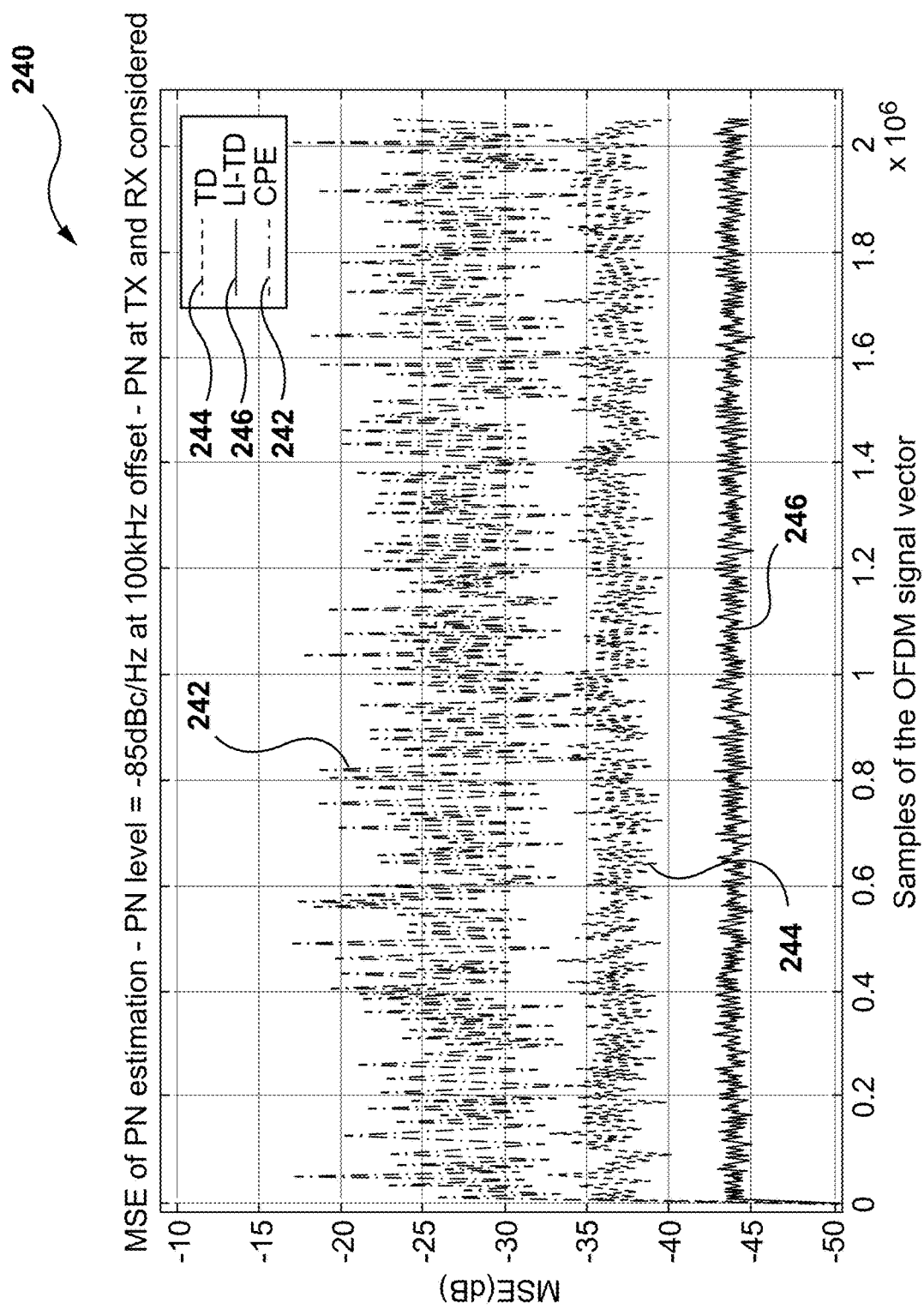
FIG. 13 is a graph showing a performance of various PN estimation methods for a 1024-QAM constellation.

The present PN suppression technology is not only effective is suppressing PN for a 256-QAM constellation, it is also effective in suppressing PN in signals using higher order modulation. Simulation results for a 1024-QAM constellation are presented in similar fashion on FIGS. 13, 14 and 15. FIG. 13 is a graph showing a performance of various PN estimation methods for a 1024-QAM constellation using the conventional common phase error removal and time domain phase suppression methods as well as the phase noise removal method introduced in FIG. 6. On a graph 210, a MSE is expressed in dB, on a vertical axis, as a function of samples of the OFDM signal vector, on a horizontal axis. PN introduced by the LOs at both the TX and RX sides is considered. A MSE curve 242 shows that the performance is poor and varies significantly between symbols when CPE removal is used. A MSE curve 244 shows that the performance of the conventional TD PN suppression method is better than CPE removal. A MSE curve 246 shows a much improved and consistent performance when the LI-TD suppression method is used. The comparison shown on FIG. 10 between these methods is consistent with the results shown on FIG. 13.

Figure 14:
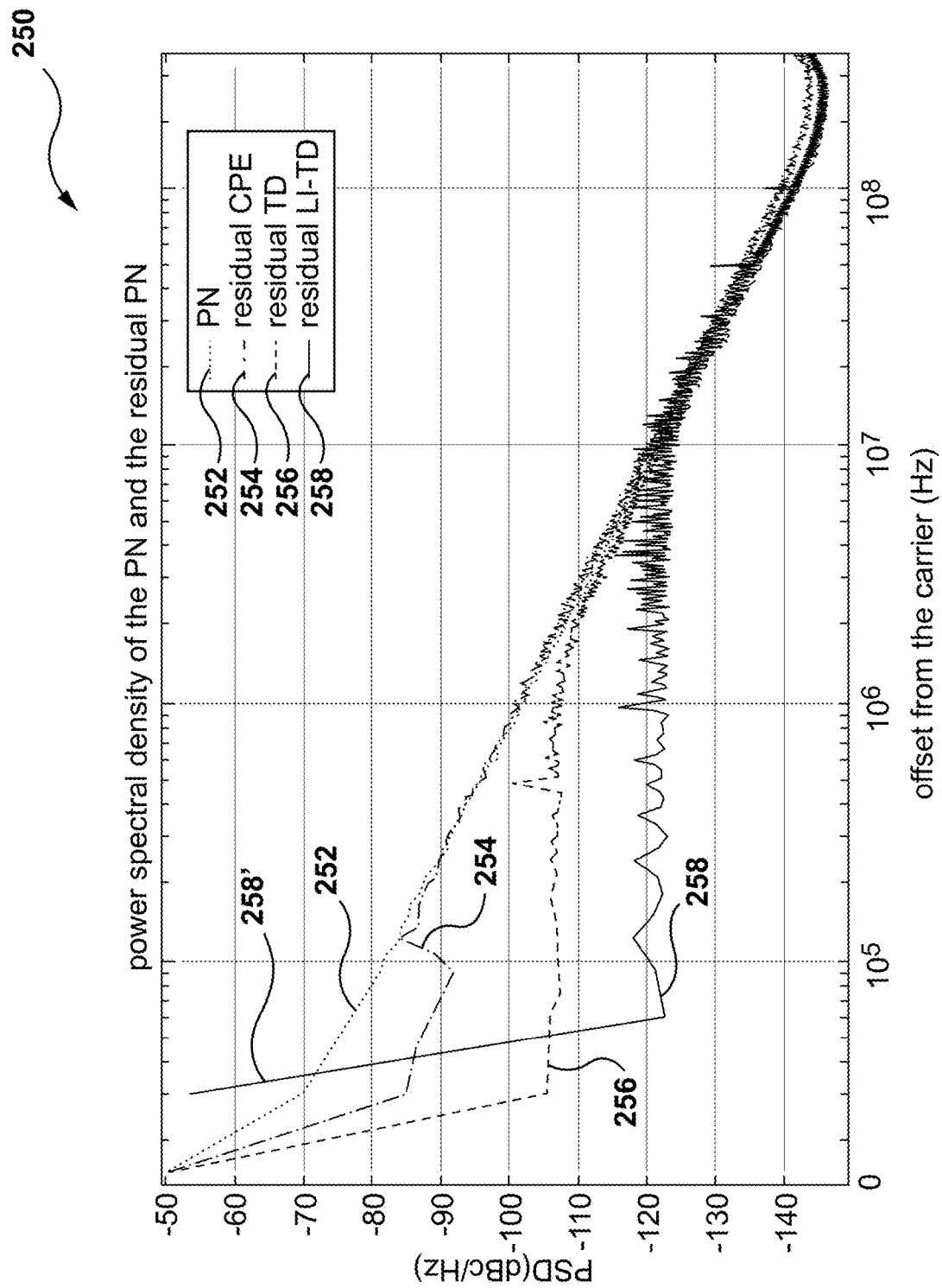
FIG. 14 is a graph showing power spectral densities of phase noise, for a 1024-QAM constellation using the conventional common phase error removal and time domain phase suppression methods as well as the phase noise removal method introduced in FIG. 6.

FIG. 14 is a graph showing power spectral densities of phase noise, for a 1024-QAM constellation using the conventional common phase error removal and time domain phase suppression methods as well as the phase noise removal method introduced in FIG. 6. On a graph 250, a PSD of the PN is shown on a vertical axis and an offset from the signal carrier is shown on a horizontal axis. A curve 252 shows the PSD of the PN, a curve 254 shows a PSD of the remaining PN after CPE removal, a curve 256 shows a PSD of the remaining PN when using the conventional TD PN suppression method and a curve 258 shows a PSD of the remaining PN when using the LI-TD PN suppression method. As in the case of FIG. 11, curve 258 shows the much better performance of the LI-TD PN suppression method. A section 258' of the curve 258 is also an artefact from the simulation process used to produce the graph 250.

Figure 15:
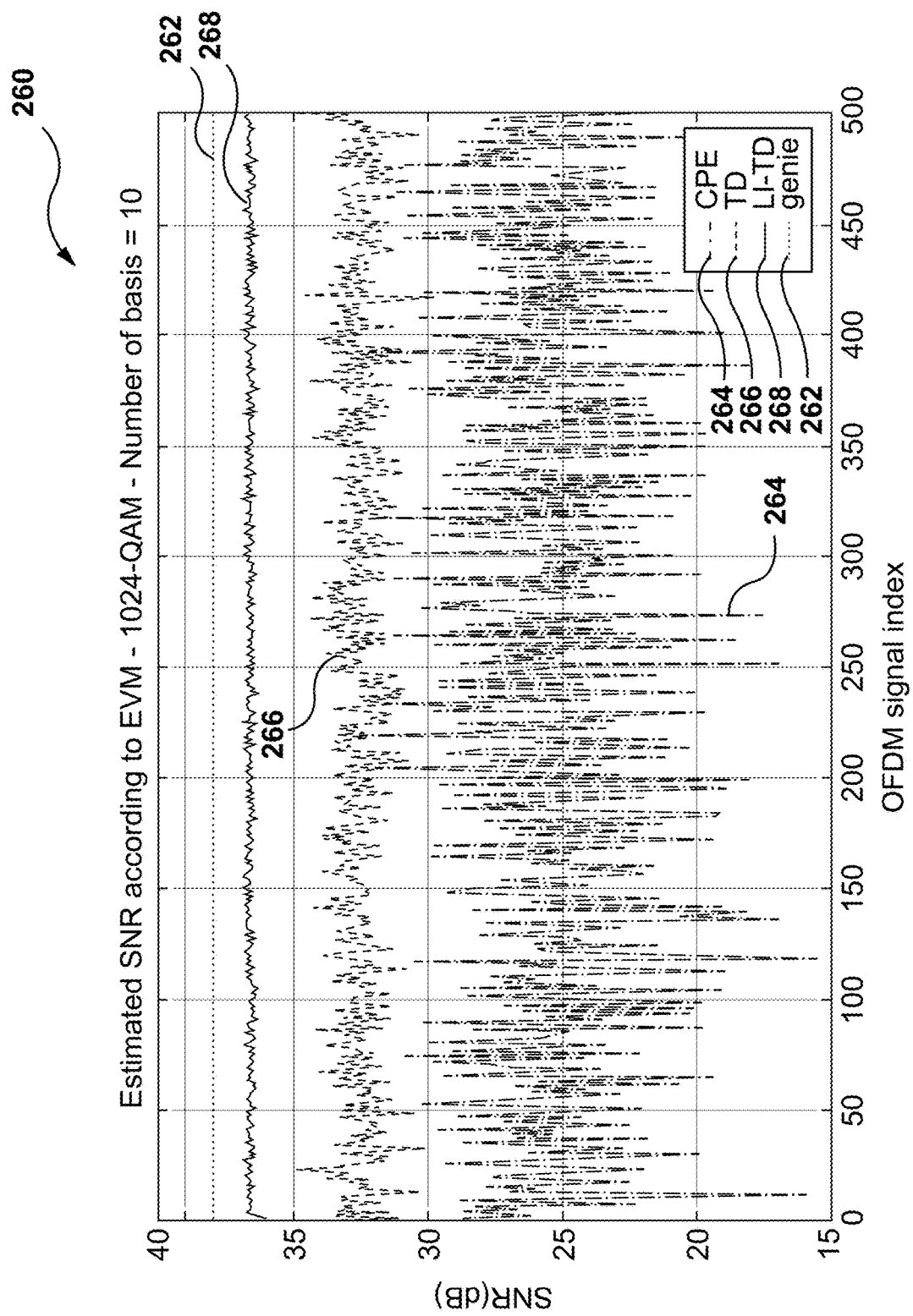
FIG. 15 is a graph showing signal to noise ratio performance, for a 1024-QAM constellation using the conventional common phase error removal and time domain phase suppression methods as well as the phase noise removal method introduced in FIG. 6.

FIG. 15 is a graph showing signal to noise ratio performance, for a 1024-QAM constellation using the conventional common phase error removal and time domain phase suppression methods as well as the phase noise removal method introduced in FIG. 6. A graph 260 shows an average output SNR of the demodulated signals, on a vertical axis, as a function of an OFDM symbol index, on a horizontal axis. A curve 262 shows a theoretical maximum SNR that would be obtained using the genie PN suppression algorithm. A curve 264 shows the SNR obtained using CPE removal only. A curve 266 shows the SNR obtained using the conventional TD suppression method. A curve 268 shows the SNR obtained using the LI-TD suppression method. As in the case of the 1024-QAM constellation, the LI-TD suppression method is almost as good as the genie algorithm and provides a significant improvement over the CPE removal method and the conventional TD suppression method.

In the case of 1024-QAM, 4.2 iterations on average were used in the simulations. This increase in the number of iterations between the 256-QAM and 1024-QAM is caused by the fact that the constellation is now denser and is more vulnerable to effects of the PN. The pilot overhead being kept constant, the PN estimation performance of the initial iteration, using the conventional PN suppression method, is less effective. A weaker initial PN estimation causes the larger number of iterations.

Table III provides a comparison of the average and minimum SNR values for the 1024-QAM constellation using various PN estimation methods.

TABLE III

| Applied method | Average output SNR (dB) | Minimum output SNR (dB) |
| --- | --- | --- |
| No PN removal | −1.9 | — |
| CPE only | 25.4 | 15.5 |
| TD | 32.5 | 30 |
| LI-TD | 36.6 | 36.3 |

Figure 16:
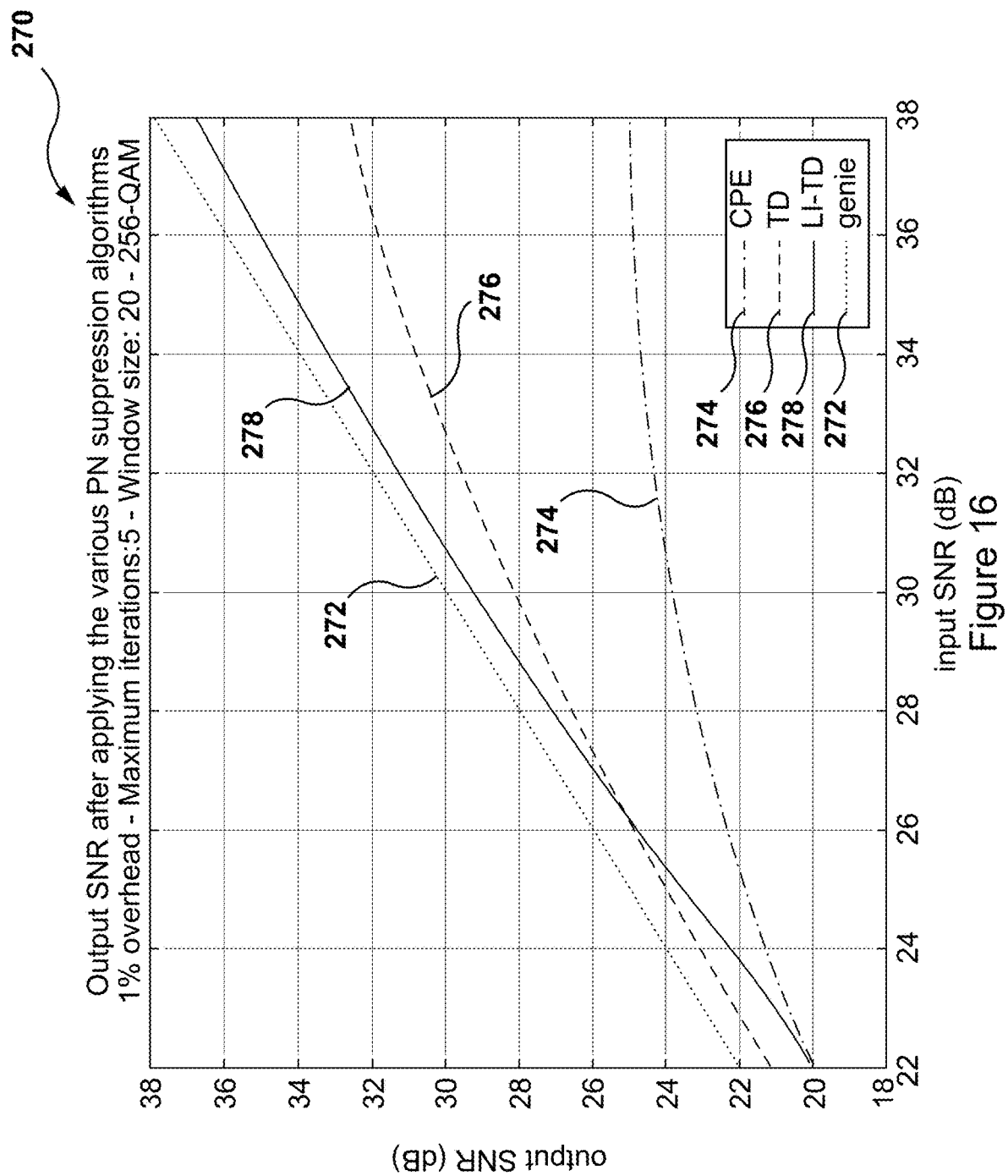
FIG. 16 is a graph showing output signal to noise ratio performance, for a 256-QAM constellation using the conventional common phase error removal and time domain phase suppression methods as well as the phase noise removal method introduced in FIG. 6.

FIG. 16 is a graph showing output signal to noise ratio performance, for a 256-QAM constellation using the conventional common phase error removal and time domain phase suppression methods as well as the phase noise removal method introduced in FIG. 6. A graph 270 shows an "output SNR", on a vertical axis, as a function of an "input SNR", on a horizontal axis. The "input SNR" is a representation of the SNR without any PN, in the presence of AWGN. The "output SNR" is a representation of the SNR after PN suppression in a signal in which the transmit-side LO 8 and the receive-side LO 14 have introduced PN. The graph 270 compares various PN suppression methods for a 256-QAM constellation in which there is a 1% pilot symbol overhead, the LI-TD suppression algorithm being executed with a maximum of 5 iterations and using a window size of 20. A curve 272 shows that the output SNR would be identical to the input SNR if an ideal genie algorithm was used. A wide gap between the curve 272 and a curve 274 shows that using CPE removal to a high SNR input signal fails to provide a good output SNR. A curve 276 shows that the conventional TD PN suppression method is fairly good at low input SNR values only. A curve 278 shows that the LI-TD PN suppression method nearly tracks the ideal curve 272 for most input SNR values. It may be observed that lower input SNR values shown on the horizontal axis of the graph 270 are not sufficient for properly decoding a 256-QAM constellation. It may also be observed that both curves 274 and 276 tend to reach plateaus at high input SNR values, which demonstrates that the performance of the CPE removal and of the conventional TD PN suppression method fails to benefit from higher input SRN values.

Figure 17:
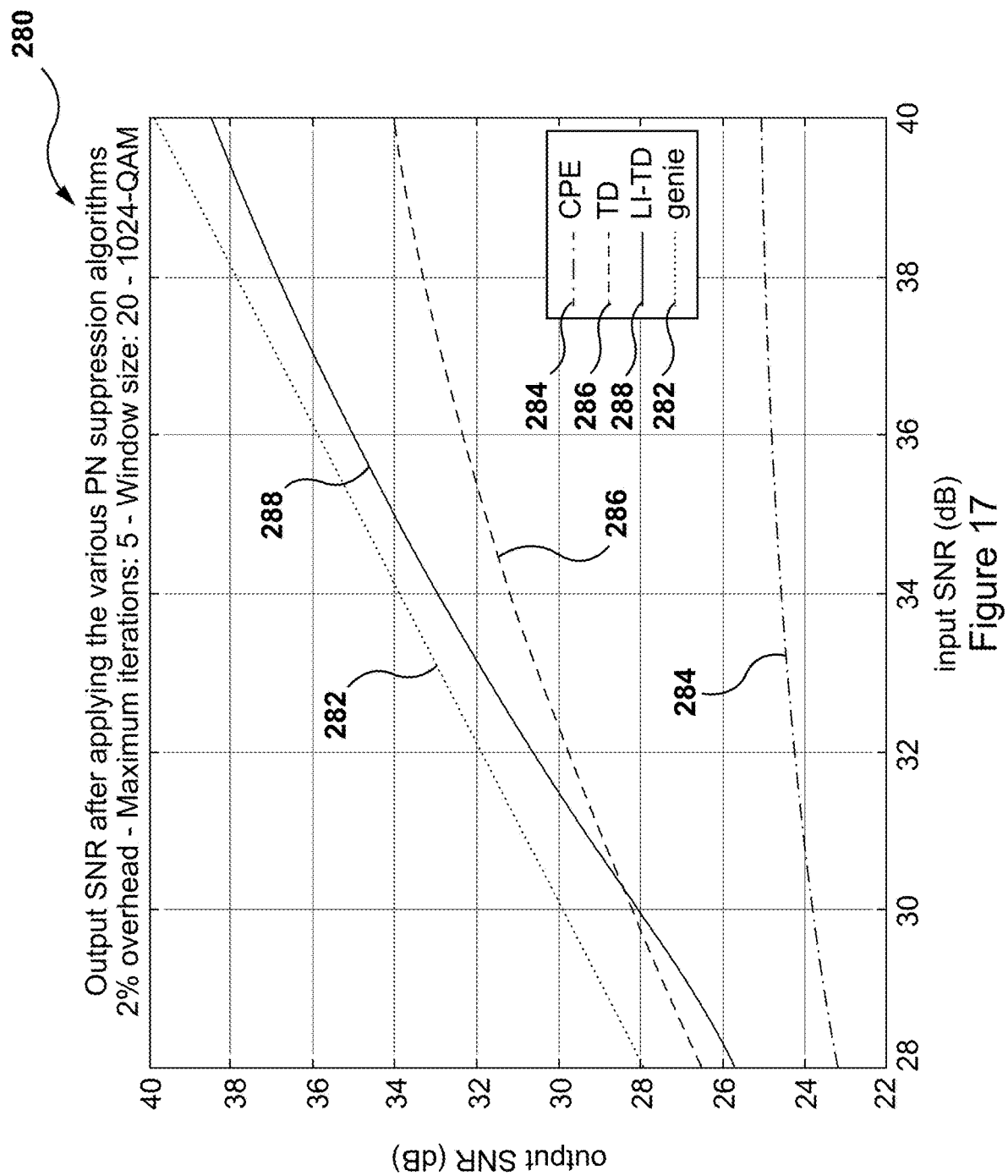
FIG. 17 is a graph showing output signal to noise ratio performance, for a 1024-QAM constellation, using the conventional common phase error removal and time domain phase suppression methods as well as the phase noise removal method introduced in FIG. 6.

FIG. 17 is a graph showing output signal to noise ratio performance, for a 1024-QAM constellation, using the conventional common phase error removal and time domain phase suppression methods as well as the phase noise removal method introduced in FIG. 6. A graph 280 shows an output SNR, on a vertical axis, as a function of an input SNR, on a horizontal axis. The graph 280 compares various PN suppression methods for a 1024-QAM constellation in which there is a 2% pilot symbol overhead, the LI-TD suppression algorithm being executed with a maximum of 5 iterations and using a window size of 20. Conclusions that may be made considering the graph 270 are also visible on the graph 280, which shows a curve 282 for the ideal genie algorithm, a curve 284 for the CPE removal, a curve 286 for conventional TD PN suppression method, and a curve 288 for the LI-TD PN suppression method. It is noted that the LI-TD PN suppression method is particularly effective in the presence of moderate to high input SNR values. Plateauing of the curves 284 and 286 becomes more evident at higher SNR values.

Figure 18:
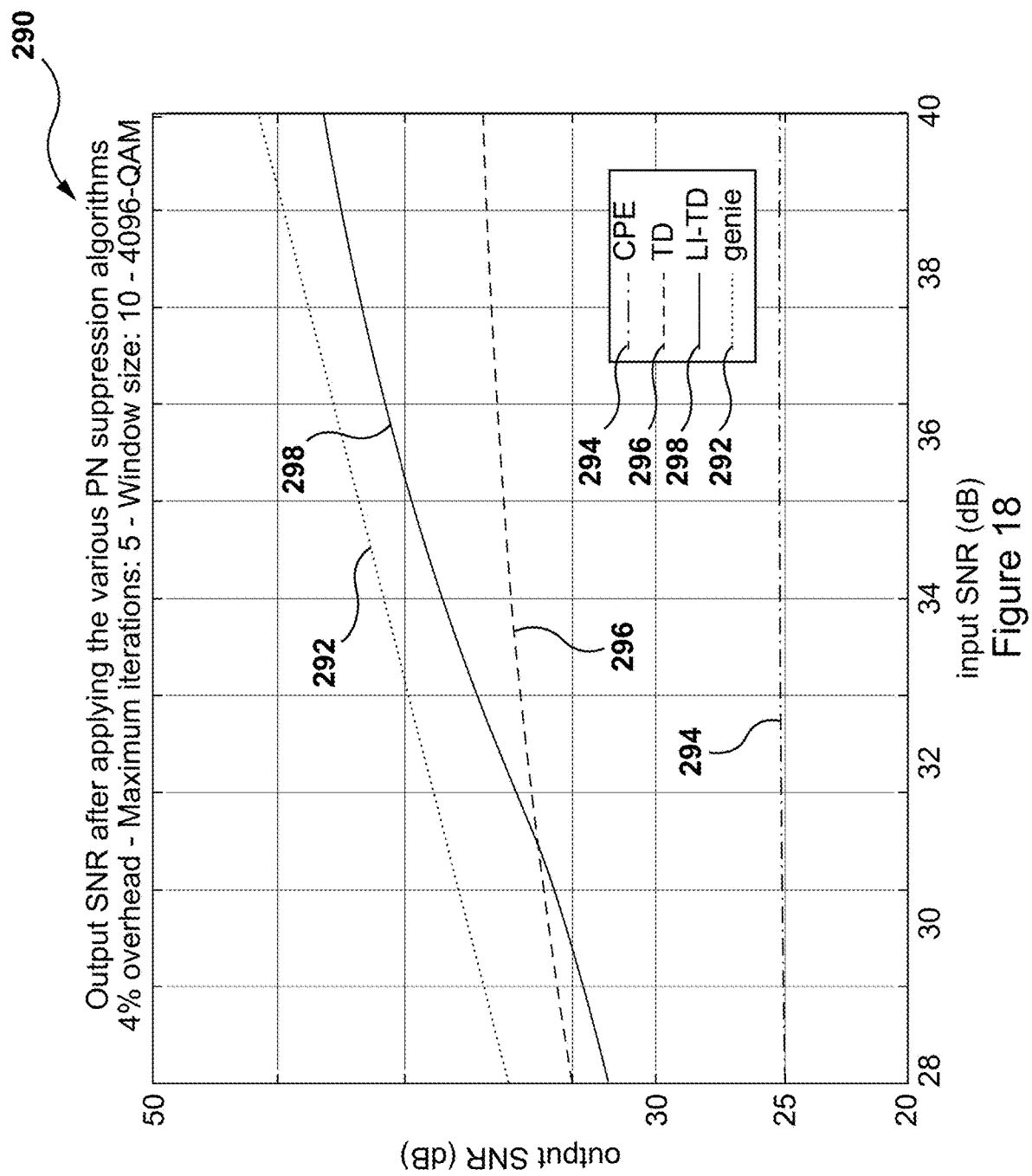
FIG. 18 is a graph showing output signal to noise ratio performance, for a 4096-QAM constellation, using the conventional common phase error removal and time domain phase suppression methods as well as the phase noise removal method introduced in FIG. 6.

FIG. 18 is a graph showing output signal to noise ratio performance, for a 4096-QAM constellation, using the conventional common phase error removal and time domain phase suppression methods as well as the phase noise removal method introduced in FIG. 6. A graph 290 shows an output SNR, on a vertical axis, as a function of an input SNR, on a horizontal axis. The graph 290 compares various PN suppression methods for a 4096-QAM constellation in which there is a modest increase of the pilot symbol overhead to 4%, the LI-TD suppression algorithm being executed with a maximum of 5 iterations and using a window size of 10. The smaller window size of 10 is selected in order to better follow small variations in the PN. Conclusions that may be made considering the graphs 270 and 280 are also visible on a curve 292 for the ideal genie algorithm, a curve 294 for the CPE removal, a curve 296 for conventional TD PN suppression method, and a curve 298 for the LI-TD PN suppression method. It is noted that the LI-TD PN suppression method is particularly effective in the presence of high input SNR values, which are in any case required for properly decoding a 4096-QAM constellation.

Considering FIGS. 16, 17 and 18, it is noticeable that LI-TD PN suppression method consistently shows better results compared to the CPE removal and the conventional TD suppression methods. As the input SNR increases, results obtained using the LI-TD PN suppression method tends toward the AWGN SNR while, using the CPE removal and the conventional TD suppression methods, a gap between the input SNR and the output become wider. Otherwise stated a higher input SNR does not translate into better PN estimation performance using earlier methods.

It also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A method for suppressing phase noise in an orthogonal frequency division multiplexing (OFDM) signal, comprising:
   in an initial iteration:
      producing an initial estimation of the phase noise in initial samples of an OFDM signal vector, and
      demodulating the initial samples of the OFDM signal vector using the initial estimation of the phase noise to generate constellation symbols for the initial iteration; and
   in at least one additional iteration following the initial iteration:
      calculating an Inverse Fast Fourier Transform (IFFT) of constellation symbols generated in a preceding iteration to reconstruct samples of the OFDM signal vector demodulated in the preceding iteration,
      estimating a phase noise effect on the reconstructed samples of the OFDM signal vector,
      producing a next estimation of the phase noise in next samples of the OFDM signal vector based on the estimated phase noise effect on the reconstructed samples of the OFDM signal vector, and
      demodulating the next samples of the OFDM signal vector using the next estimation of the phase noise to generate constellation symbols for the at least one additional iteration.

2. The method of claim 1, wherein the preceding iteration is an immediately preceding iteration.

3. The method of claim 1, wherein producing the next estimation of the phase noise in the OFDM signal comprises:
   calculating a moving average of values of the estimated phase noise effect on the reconstructed samples of the OFDM signal vector;
   calculating an angle of the moving average of the values of the estimated phase noise effect; and
   interpolating the angle of the moving average of the values of the estimated phase noise effect.

4. The method of claim 3, wherein the moving average is calculated over a window size in a range of 5 to 50 values of the estimated phase noise effect.

5. The method of claim 1, wherein:
demodulating the initial samples of the OFDM signal vector using the initial estimation of the phase noise comprises de-rotating the initial samples of the OFDM signal vector using the initial estimation of the phase noise; and
demodulating the next samples of the OFDM signal vector using the next estimation of the phase noise comprises de-rotating the next samples of the OFDM signal vector using the next estimation of the phase noise.

6. The method of claim 1, wherein:
demodulating the initial samples of the OFDM signal vector using the initial estimation of the phase noise comprises slicing the demodulated initial samples of the OFDM signal vector to generate the constellation symbols for the initial iteration; and
demodulating the next samples of the OFDM signal vector using the next estimation of the phase noise comprises slicing the demodulated next samples of the OFDM signal vector to generate the constellation symbols for the at least one additional iteration.

7. The method of claim 1, wherein estimating the phase noise effect on the reconstructed samples of the OFDM signal vector comprises comparing samples of the OFDM signal vector from the preceding iteration with the reconstructed samples of the OFDM signal vector.

8. The method of claim 7, further comprising applying a time delay to the OFDM signal vector to align the samples of the OFDM signal vector from the preceding iteration with the reconstructed samples of the OFDM signal vector.

9. The method of claim 1, wherein the initial and next estimations of the phase noise are produced in the time domain.

10. The method of claim 1, wherein a constellation size is selected from 2, 4, 8, 16, 32, 66, 128, 256, 512, 1024, 2048 and 4096.

11. The method of claim 1, wherein producing the initial estimation of the phase noise in the samples of the OFDM signal vector comprises:
removing a common phase error on all subcarriers of the OFDM signal based on pilot symbols contained in the OFDM signal; and
implementing a feedback loop using forward error correction to iteratively mitigate inter carrier interference within the OFDM signal.

12. The method of claim 1, wherein producing the initial estimation of the phase noise in the initial samples of the OFDM signal vector comprises applying a linear transformation on a time-domain representation of pilot information contained in the OFDM signal to produce a time-dependent representation of the phase noise.

13. The method of claim 1, further comprising:
comparing the constellation symbols generated in the at least one additional iteration with the constellation symbols generated in the preceding iteration; and
initiating another additional iteration if a difference between the constellation symbols generated in the at least one additional iteration and the constellation symbols generated in the preceding iteration is greater than a predetermined margin and if a predetermined maximum number of iterations has not been reached.

14. A non-transitory computer readable medium having stored thereon computer executable instructions that, when executed, cause a processor to perform a method for suppressing phase noise in an orthogonal frequency division multiplexing (OFDM) signal as defined in claim 1.

15. A decoder for suppressing phase noise in an orthogonal frequency division multiplexing (OFDM) signal, comprising:
a local oscillator adapted to convert an OFDM signal to an OFDM signal vector;
an OFDM demodulator adapted to demodulate the OFDM signal vector to produce demodulated samples of the OFDM signal vector using a supplied phase noise estimation;
a slicer adapted to generate constellation symbols from the demodulated samples of the OFDM signal vector; and
a processing unit operatively connected to the local oscillator, to the OFDM demodulator and to the slicer, the processing unit being adapted to, in an initial iteration:
produce an initial estimation of the phase noise in initial samples of the OFDM signal vector, and
supply the initial estimation of the phase noise to the OFDM demodulator;
the processing unit being further adapted to, in at least one additional iteration following the initial iteration:
calculate an Inverse Fast Fourier Transform (IFFT) of constellation symbols generated in a preceding iteration to reconstruct samples of the OFDM signal vector demodulated in the preceding iteration,
estimate a phase noise effect on the reconstructed samples of the OFDM signal vector,
produce a next estimation of the phase noise in next samples of the OFDM signal vector based on the estimated phase noise effect on the reconstructed samples of the OFDM signal vector, and
supply the next estimation of the phase noise to the OFDM demodulator.

16. The decoder of claim 15, wherein the OFDM demodulator is further adapted to de-rotate the samples of the OFDM signal vector using the supplied phase noise estimation.

17. The decoder of claim 15, wherein the OFDM demodulator comprises a Fast Fourier Transform (FFT) processor.

18. The decoder of claim 15, wherein the processing unit is further adapted to implement an estimator for calculating the phase noise effect on the reconstructed samples of the OFDM signal vector based on comparing samples of the OFDM signal vector from the preceding iteration with the reconstructed samples of the OFDM signal vector.

19. The decoder of claim 18, wherein the processing unit is further adapted to implement a delay processor for applying a time delay to the OFDM signal vector to align the samples of the OFDM signal vector from the preceding iteration with the samples of the reconstructed OFDM signal vector.

20. The decoder of claim 19, wherein the processing unit is further adapted to implement:
an IFFT processor for reconstructing the samples of the OFDM signal vector demodulated in the preceding iteration;
a filter for calculating a moving average of values of the estimated phase noise effect on the reconstructed samples of the OFDM signal vector;
an angle calculator for calculating an angle of the moving average of the values of the estimated phase noise effect; and an interpolator for interpolating the angle of the moving average of the values of the estimated phase noise effect, the interpolator producing the next estimation of the phase noise.

21. The decoder of claim 15, wherein:

the OFDM signal contains forward error correction (FEC) information; and the processing unit is further adapted use the FEC information after suppressing the phase noise in the samples of the OFDM signal vector to correct data errors present in the constellation symbols.

* * * * *

UNITED STATES PATENT AND TRADEMARK OFFICE
CERTIFICATE OF CORRECTION

PATENT NO.       : 10,708,107 B1
APPLICATION NO.  : 16/565870
DATED            : July 7, 2020
INVENTOR(S)      : Peyman Neshaastegaran et al.

Page 1 of 1

It is certified that error appears in the above-identified patent and that said Letters Patent is hereby corrected as shown below:

In the Specification

Column 8, Lines 33-35, "In some implementations of the present technology, a constellation size is selected from 2, 4, 8, 16, 32, 66, 128, 256, 512, 1024, 2048 and 4096." should read -- In some implementations of the present technology, a constellation size is selected from 2, 4, 8, 16, 32, 64, 128, 256, 512, 1024, 2048 and 4096. --

In the Claims

Claim 10, Column 25, Lines 38-40, "The method of claim 1, wherein a constellation size is selected from 2, 4, 8, 16, 32, 66, 128, 256, 512, 1024, 2048 and 4096." should read -- The method of claim 1, wherein a constellation size is selected from 2, 4, 8, 16, 32, 64, 128, 256, 512, 1024, 2048 and 4096. --

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*